United States Patent
Lal et al.

(10) Patent No.: US 12,505,727 B2
(45) Date of Patent: Dec. 23, 2025

(54) SYSTEMS AND METHODS FOR AUTOMATIC CONFIGURATION OF A VIRTUAL REALITY PLAY AREA AND PHYSICAL HARM AVOIDANCE

(71) Applicant: Adeia Guides Inc., San Jose, CA (US)

(72) Inventors: Dhananjay Lal, Englewood, CO (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 273 days.

(21) Appl. No.: 18/078,294

(22) Filed: Dec. 9, 2022

(65) Prior Publication Data

US 2024/0194045 A1  Jun. 13, 2024

(51) Int. Cl.
  *G06F 3/01* (2006.01)
  *G08B 7/06* (2006.01)
  *G08B 21/02* (2006.01)
  *G08C 17/02* (2006.01)

(52) U.S. Cl.
  CPC .......... *G08B 21/02* (2013.01); *G06F 3/011* (2013.01); *G08B 7/06* (2013.01); *G08C 17/02* (2013.01)

(58) Field of Classification Search
  CPC ........ G08B 21/02; G08B 7/066; G08C 17/02; G06F 3/011
  USPC ........................................ 345/633
  See application file for complete search history.

(56) References Cited

U.S. PATENT DOCUMENTS

| | | | |
|---|---|---|---|
| 9,898,864 B2 | 2/2018 | Shapira et al. | |
| 10,726,560 B2 | 7/2020 | Holzer et al. | |
| 10,832,477 B2 * | 11/2020 | Bailey | G06F 3/011 |
| 11,024,079 B1 * | 6/2021 | Chuah | G06T 7/246 |
| 11,250,637 B1 * | 2/2022 | Tan | G06N 5/04 |
| 11,367,250 B2 | 6/2022 | Totty et al. | |
| 2015/0346722 A1 * | 12/2015 | Herz | G01S 19/13 701/2 |
| 2017/0136289 A1 * | 5/2017 | Frank | A63B 21/4035 |
| 2017/0372499 A1 * | 12/2017 | Lalonde | G06T 19/006 |
| 2018/0286268 A1 * | 10/2018 | Ni | G02B 27/017 |
| 2018/0329209 A1 * | 11/2018 | Nattukallingal | G02B 27/01 |
| 2018/0357865 A1 * | 12/2018 | Saidi | G06F 1/163 |
| 2020/0099411 A1 * | 3/2020 | Ruttler | A61B 5/14552 |
| 2020/0292920 A1 * | 9/2020 | Lin | F16M 11/22 |
| 2020/0302768 A1 * | 9/2020 | Parfitt | G06Q 10/00 |
| 2021/0357021 A1 * | 11/2021 | Major | A61B 5/486 |
| 2022/0036656 A1 * | 2/2022 | Garcia | G06T 19/20 |
| 2023/0115887 A1 * | 4/2023 | Tan | G06T 19/006 345/633 |
| 2023/0145657 A1 * | 5/2023 | Sedani | G09B 5/065 |
| 2023/0165484 A1 * | 6/2023 | Blades | A61B 5/112 600/587 |
| 2023/0186745 A1 * | 6/2023 | Marzorati | G02B 5/32 345/419 |
| 2023/0241472 A1 * | 8/2023 | Gunn | A63B 71/0622 473/163 |

(Continued)

OTHER PUBLICATIONS

U.S. Appl. No. 18/078,293, filed Dec. 9, 2022, Dhananjay Lal.

*Primary Examiner* — Yanna Wu
(74) *Attorney, Agent, or Firm* — HALEY GUILIANO LLP

(57) ABSTRACT

A virtual reality play area is defined. Movement of an object in the vicinity of the play area may then be detected. Based on the movement of the object, it may be determined whether the object is projected to enter the play area. If the object is projected to enter the play area, a representation of the object is generated for display to the user.

20 Claims, 17 Drawing Sheets

(56) References Cited

U.S. PATENT DOCUMENTS

| | | | |
|---|---|---|---|
| 2023/0343041 A1* | 10/2023 | Perlin | E01C 9/002 |
| 2023/0398427 A1* | 12/2023 | Aksamit | A63F 13/428 |
| 2023/0408816 A1* | 12/2023 | Wieczorek | A63F 13/80 |
| 2024/0135831 A1* | 4/2024 | Ramani | G09B 5/02 |
| 2024/0153019 A1* | 5/2024 | Sedani | G06Q 50/16 |
| 2024/0265552 A1* | 8/2024 | Froimchuck | G06T 7/12 |
| 2024/0296580 A1* | 9/2024 | Li | G08B 21/02 |

* cited by examiner

2100

2102
Receive an input defining a distance threshold from the virtual reality display device for detecting motion

2104 Has motion of an object been detected in the area surrounding the user? — No → Wait Yes ↓

2106 Is the object located within the distance threshold from the virtual reality display device? — No → Wait Yes ↓

2108
Generate for display a representation of the object

FIG. 21

SYSTEMS AND METHODS FOR AUTOMATIC CONFIGURATION OF A VIRTUAL REALITY PLAY AREA AND PHYSICAL HARM AVOIDANCE

BACKGROUND

This disclosure is directed to virtual reality displays. In particular, techniques are disclosed for automatically configuring a virtual reality play area. Techniques are also disclosed for preventing physical harm to a user of a virtual reality display device.

SUMMARY

Current generation virtual reality (VR) headsets require the user to create a play area, called the guardian boundary, so that they may move around within that area free of obstruction. This protects from harm or injury during game play. If the user steps close to the edge of this play area, the headset switches from displaying content to displaying images being captured by a camera. This ensures that the user is aware of their physical surroundings, along with other visual indicators, so they prevent harming themselves. Headsets such as the Oculus™ Quest 2 headset offers a pre-configured seated play area in which the user does not avail themselves of the six degrees of freedom (6DOF) of movement. However, if the user wants to avail themselves of full 6DOF movement in a "room-scale" VR experience, they must set their play area. Room scale VR experiences are on the rise, as they are the most immersive, and generally preferred if sufficient space is available for the user to move around and bodily harm can be avoided. Currently, for room scale experiences, the user is required to draw their play area using a controller. Once set, this play area remains constant and static throughout game play.

Popular modern head mounted displays (HMDs) like the Oculus™ Quest 2 use "inside-out" tracking to determine where the HMD (or user) is located within the 3D space. While "outside-in" tracking relies on a stationary external device that is placed in the environment and tracks the HMD to determine its position in 3D space, "inside-out" tracking does not require an additional "lighthouse" device to track the HMD. Instead, the HMD cameras use sophisticated computer vision algorithms to determine and track how optical feature points in the environment move relative to the HMD. The movement of the feature points relative to the HMD is then translated into movement of the HMD in 3D space.

Currently, in order to configure a guardian boundary for VR, the user draws a virtual boundary on the floor which is projected up to the user's height, normal to the horizontal floor plane. This defines the "virtual safe zone" or cage within which the user may play in VR. Drawing the guardian on the floor, however, may not always be convenient as it leads to irregular boundaries that may not maximize the play area for a room scale VR experience. Further, the current process does not ensure that the user will have the largest possible play area based on their environment. The creation of the VR play area should be an automatic process, as the fundamental pieces of technology exist, but have not been combined in an optimal way for VR.

One of the drawbacks for VR HMDs is that they do not use depth sensing (LiDAR), even as this technology has been maturing with augmented reality (AR). For example, Apple has been embedding LiDAR scanning in its devices, (e.g., iPhones and iPads) since 2020. The use of depth sensing greatly reduces the burden on HMDs to detect distances to objects (for example obstructions to a safe play zone) using only reference markers (also called fiducial markers), image segmentation and inertial sensors. Future versions of mixed reality devices such as Meta's Project Cambria are also expected to have depth sensors.

Systems and methods are described herein for automatic creation of a guardian boundary, as soon as the user puts on their HMD and indicates they are ready to experience VR. Using the described systems and methods, a play area for a room-scale VR experience can be configured without the need for the user to specify a play area by drawing a guardian boundary using their controllers. The user stands inside the play area that they intend to use. It is not required that they stand in the center of the play area. The HMD performs time-of-flight/LiDAR/depth sensing measurements in the vicinity of the user in all directions. This is accomplished by using LiDAR sensing in all directions including the back of the user. The system augments the depth sensing measurements with data acquired or captured by optical sensors/cameras that identify features in the environment. This is accomplished by using cameras for feature sensing in all directions including the back of the user. Augmenting the depth sensing measurements with imaging data in this way results in a more accurate mapping of the area surrounding the user and the user's position within the area. This may enable the HMD to maximize the size of the play area.

The horizontal plane in the environment is then identified and the system builds the largest possible play area for the user, using all the obstruction free zones. The user may be asked to input/choose their height to determine the floor horizontal plane with high certainty. The height of the user is used to identify the floor plane, i.e., a horizontal plane at a certain height/distance from the HMD. The user's height is therefore a key input that helps ensure that the system does not choose the play area on another horizontal plane, for example a table or other large horizontal surface area. The user may be asked to input their height, or choose from a set of provided options (based on the detected horizontal planes and their vertical distance to the HMD). In another embodiment, the system may authenticate the user when they begin to use the HMD prior to configuration of play area and have the user characteristics (ex., height), preferences and profile available. In this case, the system may seamlessly configure the play area by identifying the floor plane without the explicit need for user input during the automatic configuration process. The user may be asked to look in specific directions using on-display visual indicators to fill in the information for all the directions that the system may have no information or incomplete information. The play area is then presented to the user in the familiar wire mesh presentation format. The user can then prune or trim the system generated play area if they so desire.

The system uses on-screen visual indicators to guide the user to the center of the generated play area so they may have maximum latitude of movement in all directions. During game play, the system uses depth sensing, computer vision on optical sensors as well as inertial unit measurements such as gyroscopes, accelerometers etc., in the HMD or other body-worn devices for inside-out tracking. Further, when the user strays from the center of the play area, the system may identify an inactive period of game play and guide the user back to the center.

One of the key requirements for automatic configuration of the VR play area is that system must be able to spatially map the environment around the user in all directions. This may be achieved in multiple ways. In a first method, the system uses multiple depth sensors and cameras, including at the back of the HMD (typically in the mechanism used to mount the HMD on the head) such as a strap to simultaneously understand the environment around the user and automatically return the largest possible play area. In another embodiment, smart fabrics may be used to form part or all of the HMD and/or strap. The future use of smart fabrics will allow cameras and depth sensors to be embedded in all directions for a 360-degree view and understanding of the environment. The system may "stitch" the spatial maps obtained from cameras and depth sensors to develop the 360-degree 3D surroundings. The 3D mapped surroundings are then used to determine the largest obstruction free zone. The obstruction free zone is calculated by determining the area available at the floor level horizontal plane. The user may be asked to input their height or use an available user profile to determine the floor level horizontal plane with certainty. In one embodiment, if the system determines low height features in the environment (e.g., shoes, rugs etc.), it may prompt the user to either accept those features (detected separately from the floor plane), to remove them or warn the user of their existence.

In a second method for spatial mapping of a VR headset to automatically configure the play area (when cameras and depth sensors do not offer complete 360-degree coverage), a user may be asked to slowly turn in situ (e.g., while standing) so that the spatial environment around them can be systematically mapped. Once the environment is mapped using depth sensors and cameras, the system automatically configures the play area to be the largest possible region free of obstructions, giving the user maximum freedom of movement. In one embodiment, the system may not be able to determine a sufficient area for room scale play, and may message the user to either change surroundings or switch to seated, or non-room scale, three degrees of freedom (3DOF) play.

One of the problems in VR is that users are not spatially aware of their surroundings unless they approach the guardian boundary. In more intense VR experiences, users tend to drift away in one direction towards the guardian boundary. With experiences that require higher physical activity (such as Beat Saber™ or FitVR™), the users then begin to concentrate their movement in one corner of the play area until they impinge the guardian boundary. This may often be too late to prevent harm, as the physicality of the experience, coupled with the users' tendency to drift, finds them hitting a wall or another object at the same time as they reach the guardian boundary in few quick steps. In one embodiment, in addition to automatically configuring the play area for the user, the system may also calculate a "center of VR Play area". This zone is one that reduces or minimizes the possibility of imminent exit of the play area. The center of the play area is defined as the region within which the user is allowed equal or roughly equal movement in all directions to reach the guardian boundary. Keeping the user equidistant from all sides of the guardian boundary offers them additional protection in highly physical VR experiences. The center of VR play area is surrounded by a "quick stepping and arm movement zone". Once the user steps out of the center of the play area, the system queues a command via visual (or other means, such as audio) indicators to attempt to bring them back to the center of the play area. In order to avoid disruption of the experience, the command is "blocked" (i.e., queued) until the system determines that the user is not actively in a gaming session. When the user is determined to not be in an active session, the system once again checks whether the user is outside the center of the play area. If this is the case, the system corrects the drift by bringing the user back again into the center of the play area.

To determine whether the user is actively in a gaming session, the system uses inertial unit measurements from the HMD and controllers (x, y, z, qx, qy, qz) to infer whether the time rate of change of the positional and orientation coordinates are high or low. If the time rate of change is high, it may indicate active gaming activity that should not be interrupted with messaging to bring the user back to the play area center. On the other hand, if the time rate of change is low, the system inferences that the user is not in an active gaming session. In an alternative implementation, the OS may also query the application that responds with a message indicating whether gaming activity is ongoing.

In one embodiment, the system may also recommend a user orientation for gaming activity. In some VR experiences, based on the design, users may be more inclined to take steps forward and backward looking in a particular direction. In other experiences, users may be more inclined to take steps sideways as they play. While automatic configuration of the VR play area may create large obstruction-free zones, these zones may be irregular in dimension. Based on the experience, the system may receive parameters from the application on the configuration of the play area. For example, an experience may invoke the system (e.g., the HMD) to deliver a play area that is larger in the x-dimension than in the y-dimension. This is based on the user's orientation in the space. After the system has identified the play area, it recommends a specific orientation for the user. If the user drifts from that orientation, the system once again reminds the user to return to the preferred orientation when an active session is not in progress.

Today's VR headsets offer two features to deal with physical harm avoidance and safe immersion, mainly "passthrough" and "space sense." The "space sense" feature, detects people, pets and other objects located within a certain distance of the user that enter the play space. The user is presented with outlines of the objects and is able to see exactly where they are in the real world. The "space sense" feature outlines the object (e.g., kid, pet) based on a distance specified in the settings (e.g., 4 ft or 5 ft). However, this interferes with the user experience. For example, any object (stationary or moving) will always be visible based on the distance between the object and headset in settings. A user wearing their headset might not be in danger of colliding with one outside of their defined space boundary if, for example, the other person (e.g., partner) is sitting on the couch and reading a book or watching a movie. Therefore, there is no need to alert the user (e.g., via outlining as is done in space sense today) of the presence of stationary objects or any moving object unless that object is in the process of intruding or encroaching on the user's guardian boundaries in order to avoid an accident or collision.

In one embodiment, passthrough is only enabled to see the moving object since the user might not be concerned with a light fixture 5 feet away from their boundary. Additionally, alerts can be displayed to indicate that an object is approaching, and the passthrough or space sense feature is then enabled when the object is close to the user. In one embodiment, the HMD may use sensors to identify and present only "live" objects capable of movement, such as a human or a pet (for example, with infra-red sensing these objects appear with elevated temperature, i.e., warm in thermal imaging from infrared sensing). In a related embodiment, the system may identify a "live" object and also determine whether that object is moving or imminently approaching either the guardian boundary or the configured "space sense" perimeter, presenting only those objects that are live, moving and/or approaching.

In one embodiment, the user's VR headset relies on motion sensing data from a home security or home automation system to display the outlines of an approaching object or alert the user in other ways (e.g., auto enabling passthrough, displaying an alert, pausing content, etc.) based on a predefined/configurable distance between the user's HMD and the moving object. As is known in the literature of sensors, such as ultrasonic or microwave sensors, moving objects are detected based on reflected radiations from objects entering the sensors field. The reflection rate can be measured to determine the distance and therefore only objects within a predefined/configurable distance from the guardian boundary (not the HMD) can trigger the enablement of space sense or passthrough. As such, a moving object facing the HMD's motion sensor (e.g., front) is tracked with respect to the perimeter of the guardian boundary. The calculation is performed using motion sensing data from the motion sensor as well as the depth data from the HMD's imaging/LIDAR module. The user may gaze, point or circle using their controller or use similar method to notify system of the motion sensor. This completes the information needed by the system to determine position of the motion sensor with respect to the HMD. In a related embodiment, the system (HMD) passthrough and/or space sense feature is available to rules within a home automation system and may be triggered by various events such as a door opening, a window opening, or motion being detected on a sensor.

In another embodiment, an HMD with multiple sensors that are capable of detecting moving objects from multiple directions (with respect to the HMD) can auto-enable the passthrough or space sense feature even if the user is not facing the moving object. If the user is not facing the moving object, then passthrough is automatically enabled. However, if the user is facing the moving object, then space sense maybe enabled such that that user's VR experience is not completely interrupted.

Systems and methods are described herein for configuring a virtual reality play area. Depth sensing measurements are performed for an area in all directions surrounding a user. In some embodiments, one or more images of the area are also captured covering all directions surrounding the user and used to augment the depth sensing measurements. The one or more images may be captured as a series of still images, a single panoramic image, or a video clip. Based on the depth sensing measurements, a horizontal plane of the area, as well as a plurality of obstructions in the area are identified. A three-dimensional shape representing the maximum volume of contiguous open space in the area is generated based on the horizontal plane and the plurality of obstructions. If the three-dimensional shape is concave, the shape is truncated to create a convex shape. The largest possible play area is then constructed using the convex shape. In some embodiments, a representation of the play area is generated for display to the user. The user may adjust the boundaries of the play area manually if they so choose.

To identify a horizontal plane of the area, a plurality of horizontal planes may first be detected in the area. A height of the user is provided (e.g., retrieved from user data, input by the user, or automatically detected), and, based on the height of the user, a first horizontal plane of the plurality of horizontal planes is selected. To determine the height of the user, a user profile may be accessed. Height information from the user may then be retrieved from the user profile. In some embodiments, the height of the user is determined by detecting, using image recognition, a foot of the user and determining a distance to the foot of the user.

The play area may be oriented in a particular direction based on the predicted movements of the user and the size and shape of the play area. A first dimension of the play area and a second dimension of the play area are calculated, wherein a first axis of the first dimension is substantially perpendicular to a second axis of the second dimension. A predicted movement pattern of the user is identified. For example, the type of content the user is consuming may trigger the user to make a majority of movements along a single axis. Based on the predicted movement pattern, a direction in which the user is likely to make a majority of movements is determined. An orientation of the play area is then set such that the direction in which the user is likely to make a majority of movements is aligned with the larger of the first dimension and the second dimension.

In some embodiments, a center position of the play area is determined by calculating a centroid of the play area. The center position is then established based on the centroid. If the user moves too far from the center point, or too close to a boundary, a visual indicator may be generated for display to guide the user to the center position of the play area.

After detecting movement of the user, the position of the user may be compared to the center position and/or the closest point of the boundary to the user's position. If the user is within a threshold distance of the boundary, output of VR content is paused. After detecting a second movement, the user's position is again compared with the center position and/or the boundary. If the user is within a threshold distance of a center of the play area after the second movement, output of the VR content is resumed.

Systems and methods are also described herein for preventing physical harm to a user of a virtual reality display device. A play area is first defined. Movement of an object in the vicinity of the play area may then be detected. Based on the movement of the object, it may be determined whether the object is projected to enter the play area. If the object is projected to enter the play area, a representation of the object is generated for display to the user. In some cases, the user may define a threshold distance beyond which movement of objects should be ignored. Only if the object is within the threshold distance will a representation be generated for display.

To determine whether the object is projected to enter the play area, the direction of movement may be determined. A path of the object can be determined from the direction of movement and compared with a boundary of the play area. If the path intersects the boundary, it is determined that the object is projected to enter the play area. In some embodiments, a type of the object is also considered. Based on the type of the object, it is determined whether the object can change the direction or velocity of its movement. If the object cannot change its direction or its velocity, it may be determined that the object is projected to enter the play area.

In some embodiments, a position relative to an orientation of the user at which the object is projected to enter the play area may be determined. A spatial audio alert may be output to the user such that the audio alert is perceived by the user to come from the position at which the object is projected to enter the play area. If the position at which the object is projected to enter the play area is not currently within a field of view of the user, a notification that the object is projected to enter the play area may be generated for display within the field of view of the user. The notification may comprise an indication of the position at which the object is projected to enter the play area.

If the object can be remotely controlled, its trajectory or velocity may be altered to prevent the object from entering the play area. If the object cannot be remotely controlled, a representation of the object may be generated for display to the user.

In some embodiments, a notification is received from a security system. The notification may indicate that a person or object has entered the area. In response to receiving the notification, a passthrough mode of the virtual reality display device is enabled, allowing the user to see their surroundings.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 21 is a flowchart representing an illustrative process for generating for display a representation of an object that is projected to enter a play area only if the object is within a threshold distance of a user, in accordance with some embodiments of the disclosure.

DETAILED DESCRIPTION

Figure 1:
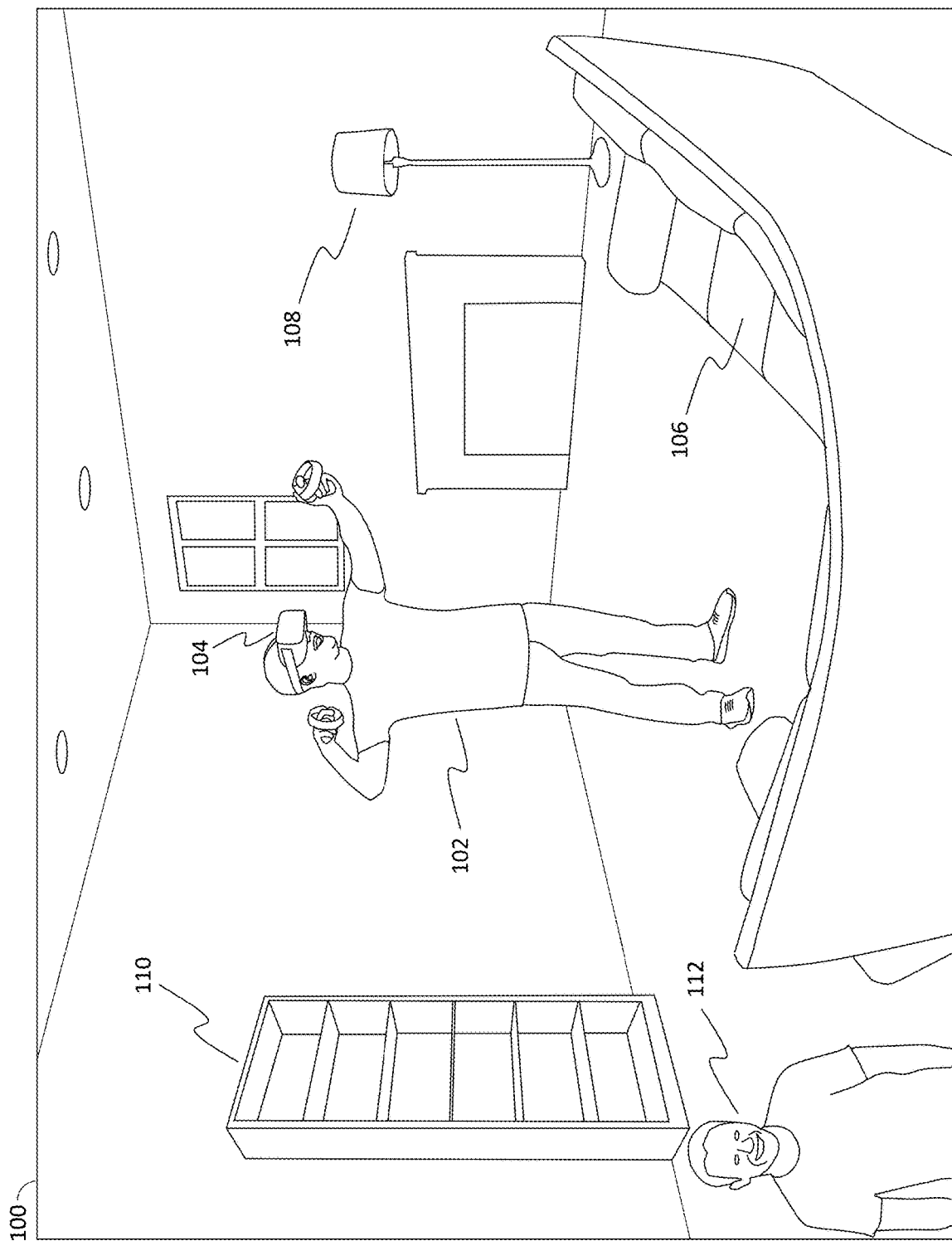
FIG. 1 shows an illustrative example of a user wearing a VR headset in an area containing obstructions and in which a play area may be defined, in accordance with some embodiments of the disclosure.

FIG. 1 shows an illustrative example of a user wearing a VR headset in an area containing obstructions and in which a play area may be defined, in accordance with some embodiments of the disclosure. Area 100 may be a room or other area in which there is sufficient space for user 102 to interact with VR content, such as a game or world simulator, using VR headset 104. When interacting with the VR content, user 102 may move around area 100. Area 100 may include obstructions to such movement, such as couch 106, lamp 108, and bookshelf 110. To prevent user 102 from colliding with any obstructions, a play area is defined, beyond which user 102 is not permitted to move while interacting with the VR content. The boundary of the play area may be enforced upon user 102 by displaying, on VR headset 104, an indication of the boundary when user 102 moves too close to the boundary and may guide user 102 back to the center of the play area. As will be described below in further detail, VR headset 104 may automatically configure the size and shape of the play area by detecting the obstructions in the area and constructing the largest possible play area without coming too close to any obstructions. Additionally, another person 112 may enter the area while user 102 is interacting with the VR content. If the other person 112 enters the play area, a notification may be presented to user 102 on VR headset 104 that person 112 has entered the play area. The movement of objects outside the play area, including person 112, may be detected. Based on the detected movements, VR headset 104 may determine whether an object is projected to enter the play area and only notify the user if it is determined that the object is projected to enter the play area.

Figure 2:
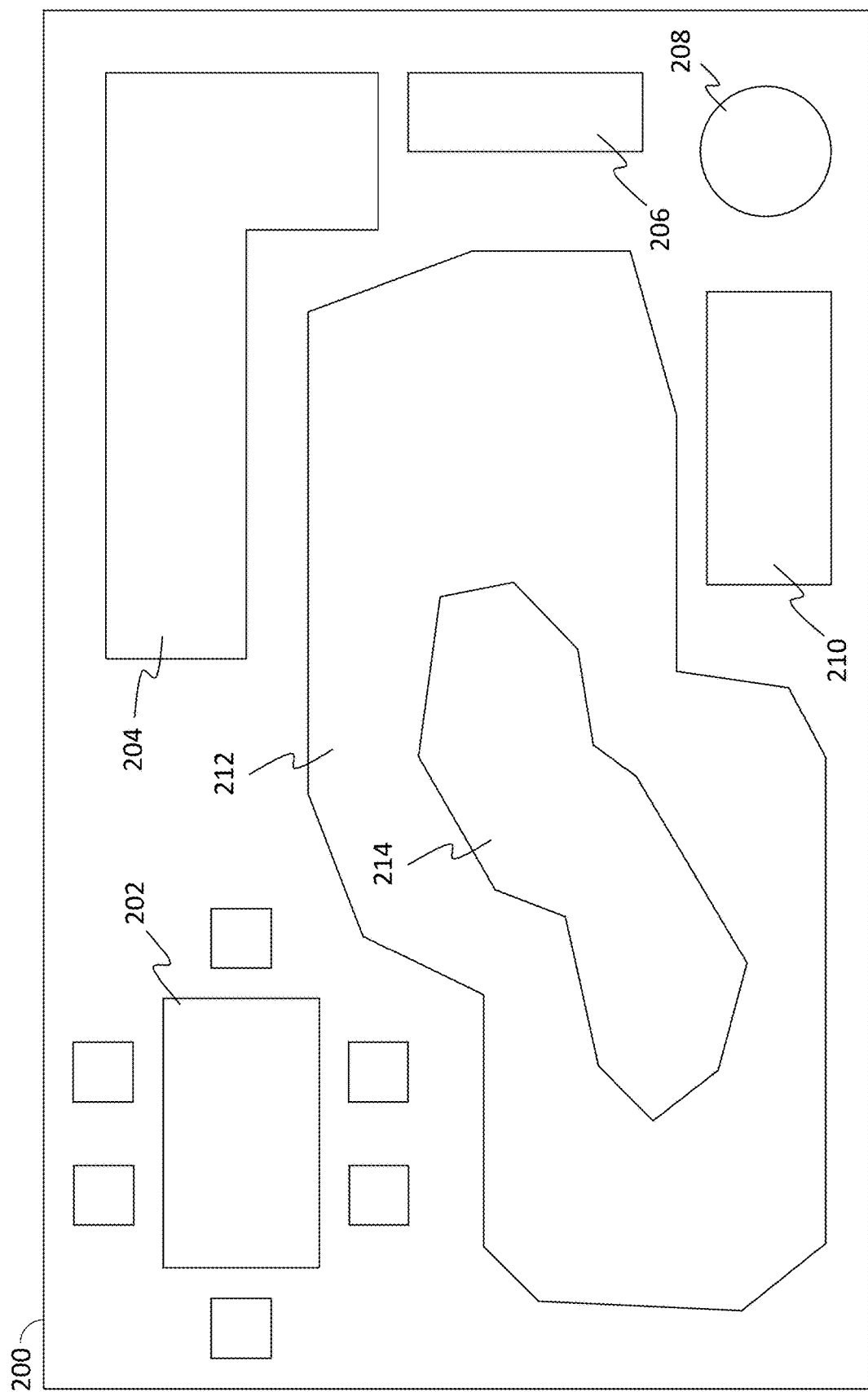
FIG. 2 shows an illustrative example of a constructed play area, in accordance with some embodiments of the disclosure.

FIG. 2 shows an illustrative example of a constructed play area, in accordance with some embodiments of the disclosure. Area 200 may include several obstructions 202, 204, 206, 208, 210 around an open space. Play area 212 can then be constructed in the open space, taking into account the edges of each of the obstructions. A center area 214 of the play area 212 may also be calculated. The size of center area 214 may be determined based on a threshold size or may be based on the type of VR content with which the user is interacting. For example, if the user is viewing a VR media asset with minimal motion required of the user, center area 214 may be determined as an area similar in shape to play area 212, centered on a center point of play area 212, and extending from the center point by no more than a set threshold distance. If, however, the user is playing a VR game that requires a lot of movement, the size of center area 214 may be increased.

Figure 3:
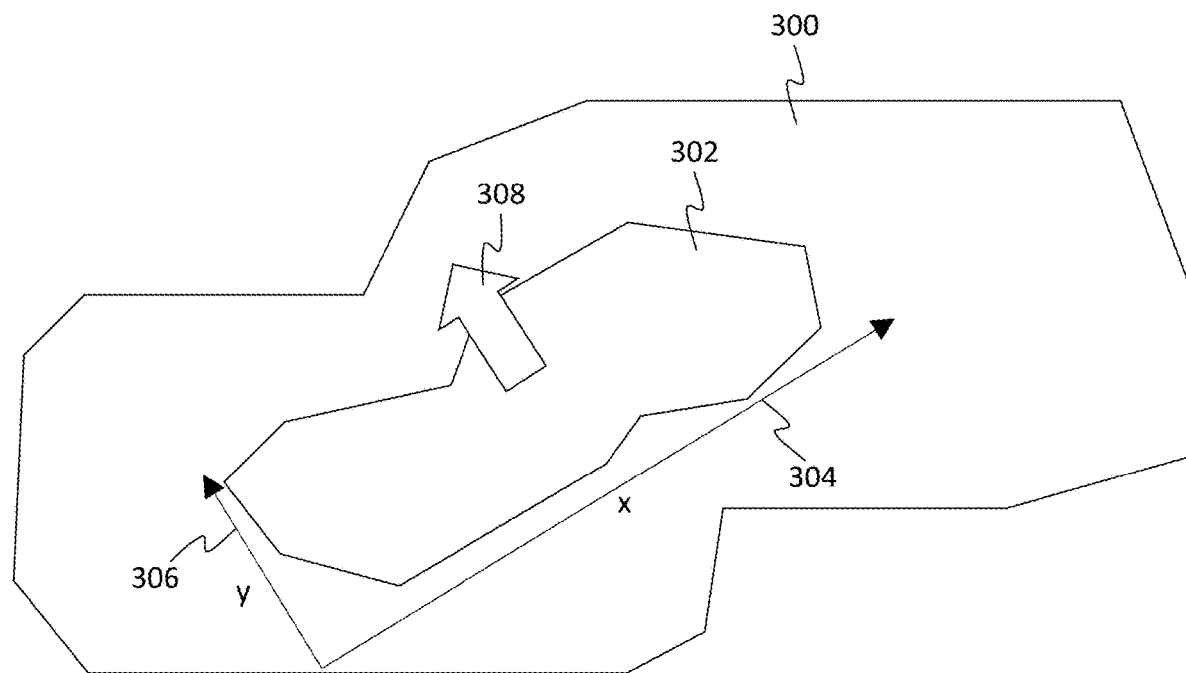
FIG. 3 shows an illustrative example of an orientation of a play area, in accordance with some embodiments of the disclosure.
Figure 4:
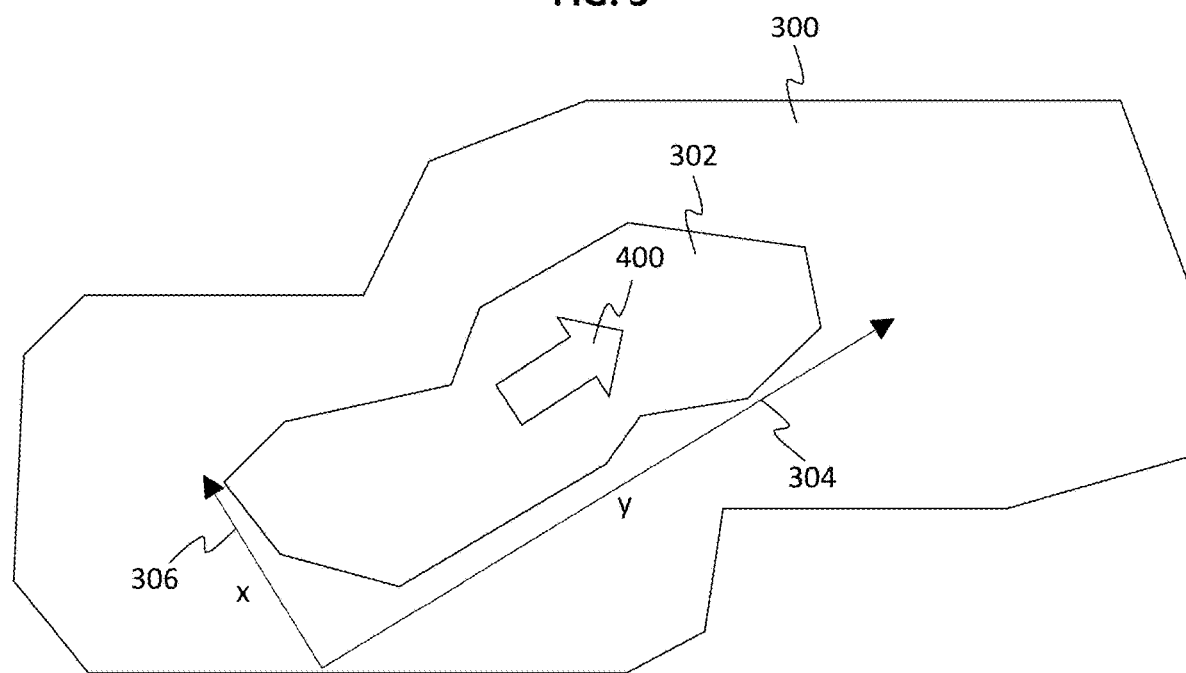
FIG. 4 shows a second illustrative example of an orientation of a play area, in accordance with some embodiments of the disclosure.

FIGS. 3 and 4 show illustrative examples of an orientation of a play area, in accordance with some embodiments of the disclosure. Play area 300 may be constructed at a maximum size while still avoiding obstructions in the surrounding area. Center area 302 may also be calculated based on play area 300. Center area 302 may be determined based on the type of VR content with which the user is interacting. A major axis 304 and a minor axis 306 of center area 302 are identified. If the type of VR content will result primarily in lateral movement, with little to no forward or backward movement, then play area 300 may be oriented in a direction 308 perpendicular to major axis 304 (parallel to minor axis 306). If, however, the type of VR content will result primarily in forward and/or backward movement, with little to no lateral movement, then play area 300 may be oriented in a direction 400 perpendicular to minor axis 306 (parallel to major axis 304).

Figure 5:
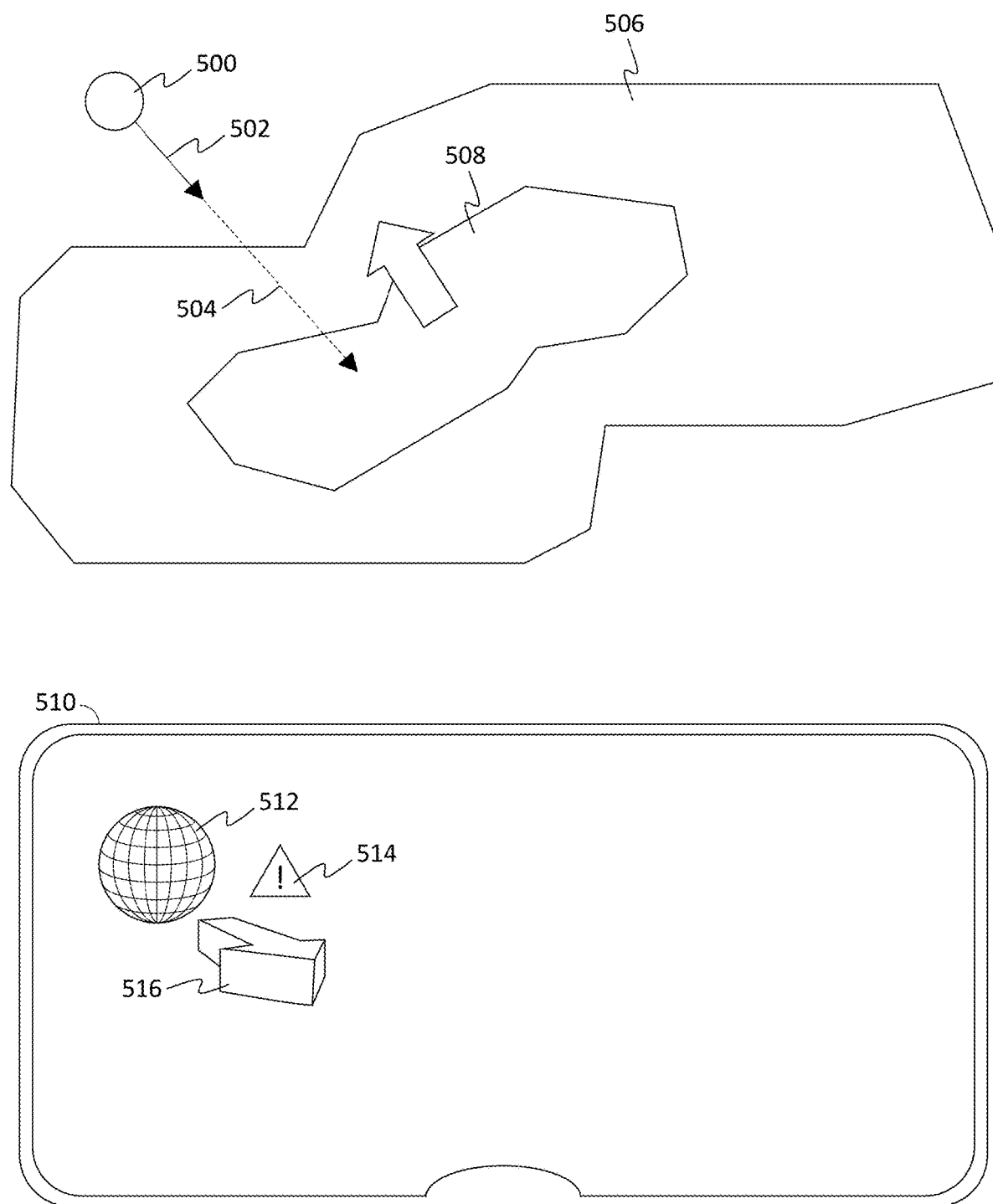
FIG. 5 shows an illustrative example of a notification to a user of a VR display device that an object that is projected to enter a play area, in accordance with some embodiments of the disclosure.

FIG. 5 shows an illustrative example of a notification to a user of a VR display device that an object that is projected to enter a play area, in accordance with some embodiments of the disclosure. The VR display device may include one or more motion sensors calibrated to detect movement of objects in the area surrounding the VR display device. Movement of object 500 may be detected by the VR display device. Based on observed movements, path 502 may be determined representing the movement of object 500. VR display device then extrapolates the movement into projected path 504. If projected path 504 enters play area 506, then the object may pose a hazard to the user. In some embodiments, only objects which are projected to enter center area 508 may be considered hazardous to the user.

If object 500 is determined to be hazardous to the user, then VR display 510 may be used to alert the user to the object. Several types of alerts may be used. For example, representation 512 of object 500 may be generated for display in a location corresponding to the direction from which the object is approaching the play area. A warning icon 514 may also be generated for display. In some embodiments, an indication 516 of the direction of travel of object 500 may also be generated for display. With this information, the user can effectively avoid the object.

Figure 6:
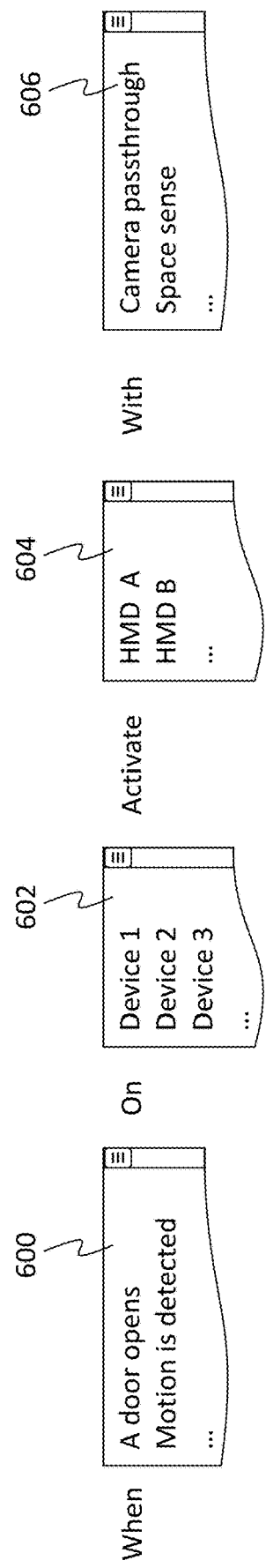
FIG. 6 shows an illustrative example of a home automation interface for setting up a routine to enable a harm avoidance mode of a VR display device, in accordance with some embodiments of the disclosure.

FIG. 6 shows an illustrative example of a home automation interface for setting up a routine to enable a harm avoidance mode of a VR display device, in accordance with some embodiments of the disclosure. The user may want to be notified when a door or window is opened, as it may indicate that someone or something has entered the user's home. The VR display device may be configured to communicate with, or receive data and/or instructions from, a security system or home automation system. The VR display device may thus be controlled as part of a home automation routine. For example, the user may select a trigger action 600, such as when a door opens or when motion is detected. A device or sensor at which the trigger action occurs 602 may also be selected. A responsive action is then configured by the user. A head-mounted display device (e.g., a VR display device) can be selected 604 for activation or control, and a mode 606 enabled to allow the user of the head-mounted display to see at least part of their surroundings, such as a camera passthrough mode or a space sense mode.

Figure 7:
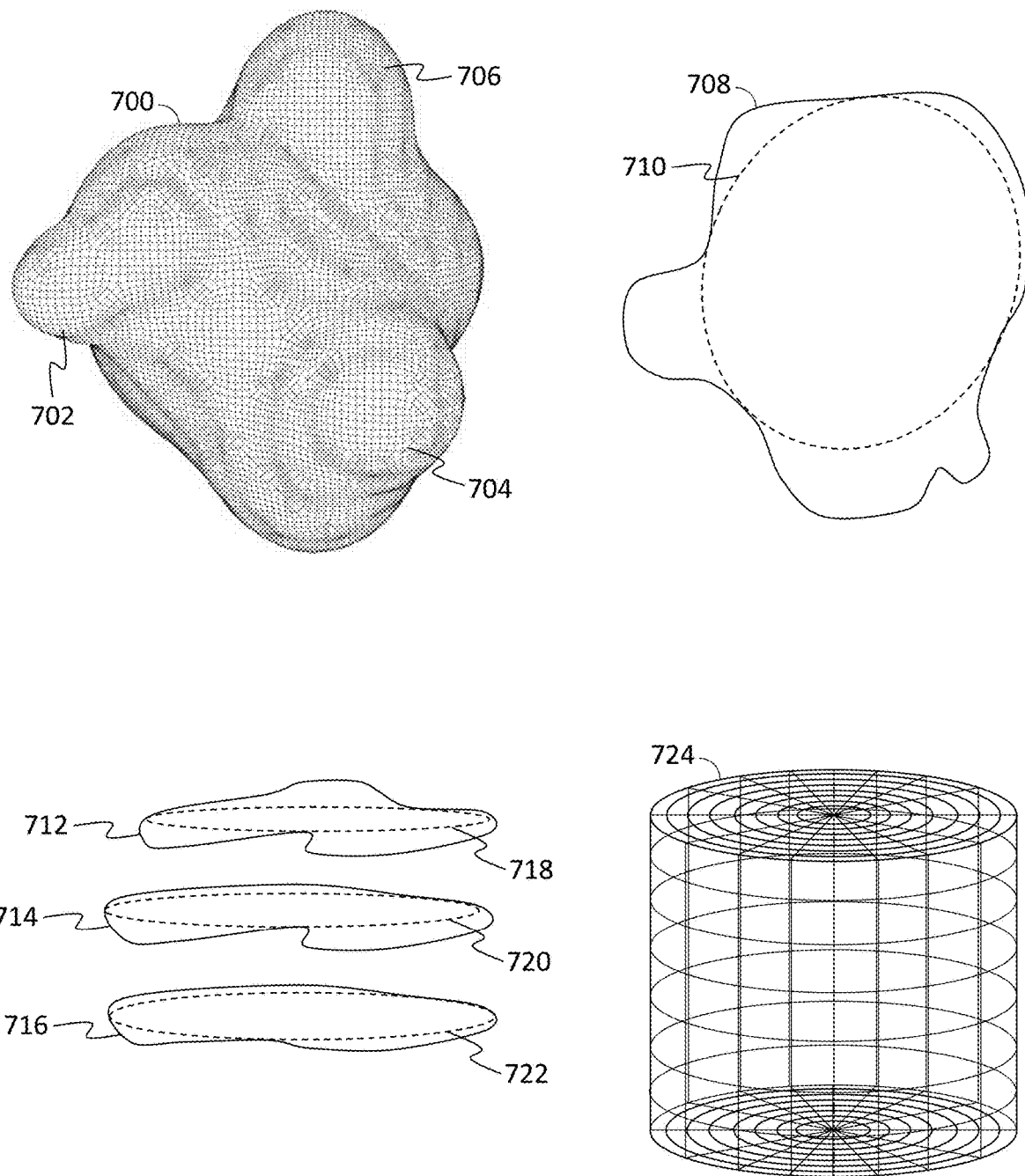
FIG. 7 shows an illustrative example of a three-dimensional shape representing a volume of contiguous open space and a truncation of the three-dimensional shape to a concave shape, in accordance with some embodiments of the disclosure.

FIG. 7 shows an illustrative example of a three-dimensional shape representing a volume of contiguous open space and a truncation of the three-dimensional shape to a concave shape, in accordance with some embodiments of the disclosure. Based on depth sensing measurements, a VR display device generates three-dimensional shape 700 representing the open space in the area surrounding the VR display device. Shape 700 may have lobes 702, 704, 706 that extend out from the main body of shape 700. Thus, shape 700 is a concave shape. The VR display device may truncate shape 700 to create a convex shape on which to base a play area. For example, a cross section 708 may be taken of shape 700 and a convex shape such as ellipse 710 inscribe within the cross section. Ellipse 710 may be maximally sized to fit within the cross section. Ellipse 710 may then be used as the basis for the play area.

In some embodiments, multiple cross sections may be analyzed in order to identify the largest convex shape that fully fits within the three-dimensional shape. For example, cross sections 712, 714, and 716 may be taken of shape 700, and ellipses 718, 720, and 722 inscribed within each cross section, respectively. The smallest of ellipses 718, 720, and 722 is then selected as the basis for the play area. A new three-dimensional shape, such as cylinder 724, may then be used to establish the play area.

Figure 8:
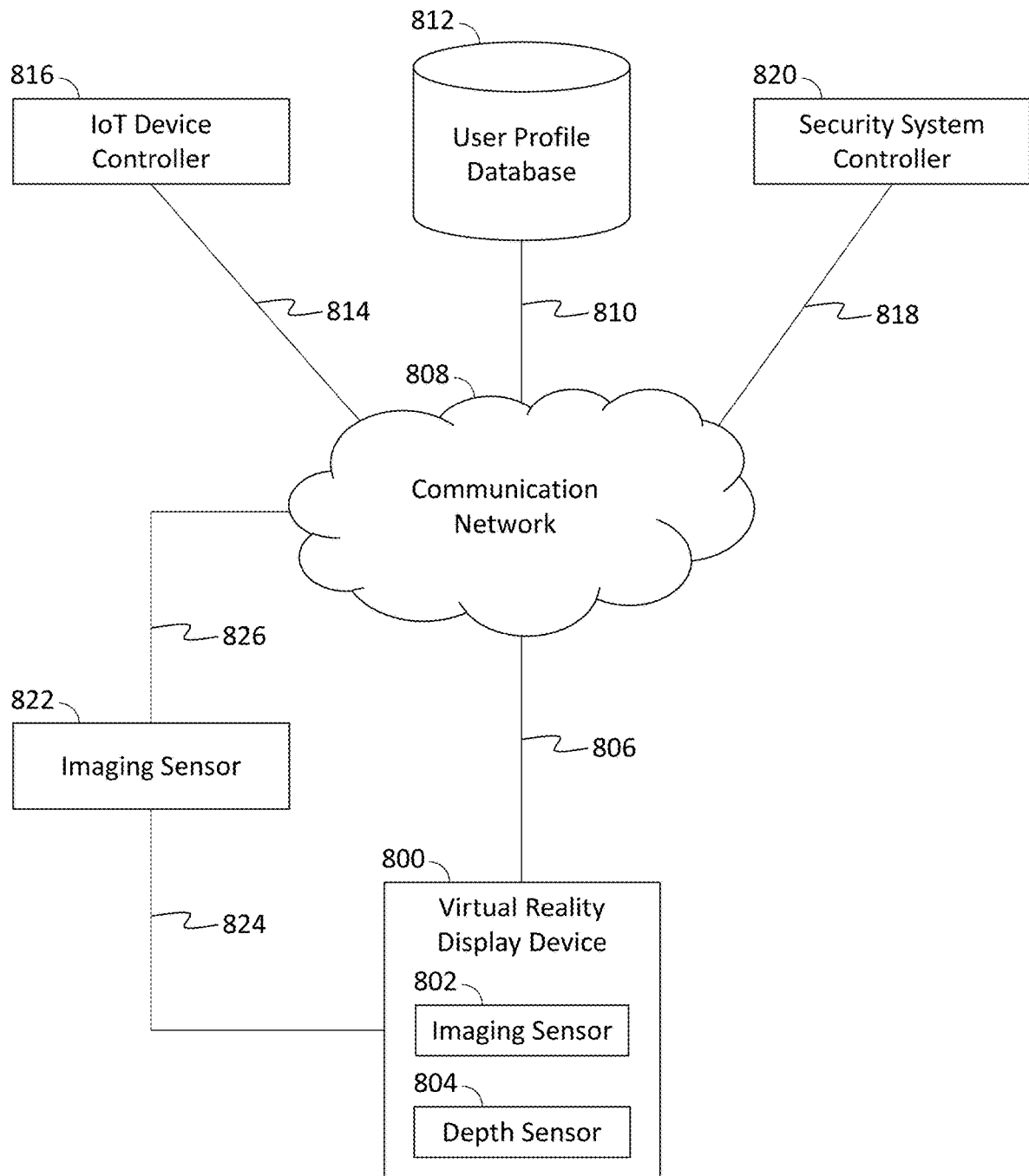
FIG. 8 is a diagram showing components of a system for automatically constructing a play area and avoiding physical harm to a user, in accordance with some embodiments of the disclosure.

FIG. 8 is a diagram showing components of a system for automatically constructing a play area and avoiding physical harm to a user, in accordance with some embodiments of the disclosure. VR display device 800 includes one or more imaging sensors 802 and one or more depth sensors 804. Imaging sensors 802 may operate in visible light and or infrared. Depth sensors 804 may comprise LiDAR sensors, ultrasonic ranging sensors, or any other suitable type of sensors for performing depth measurements. VR display device 800 may use imaging sensor 802 and depth sensor 804 to scan the area surrounding VR display device 800 to construct a play area. In some embodiments, it may be advantageous to identify a vertical plane of the area. A vertical plane may be identified from the orientation of objects in the area surrounding VR display device 800. Several horizontal planes may also be identified, depending on the number of horizontal surfaces present in the area, such as tables and counters, in addition to a floor. In order to identify the horizontal plane from which the play area should be constructed, VR display device 800 may retrieve a height of the user, which may be a close approximation to the height of VR display device 800 from the floor. A user profile containing the user's height may be stored locally at VR display device 800. In some embodiments, however, the user profile is stored in a remote server or database. VR display device 800 communicates, via communication path 806, communication network 808, and communication path 810, with user profile database 812, from which the height of the user may be retrieved. VR display device 800 then constructs a play area based on the vertical and horizontal planes, avoiding any obstruction detected based on the depth and imaging scan of the area. Communication network 808 may be any suitable type of network, including a LAN, WLAN, WAN, mobile network, or the Internet.

To help the user avoid physical harm while consuming VR content, VR display device 800 monitors the area surrounding VR display device 800 for movement. For example, VR display device 800 may use successive images captured by imaging sensor 802 to determine that an object in the area is moving. The distance moved and the time between successive captured images can be used to determine the velocity of the object, and the change in position between successive captured images can be used to determine the direction of travel. VR display device 800 may use image recognition techniques to identify the type of object that is moving. For example, the object may be another person, an animal, an inanimate object (e.g., a ball thrown in the area), or a self-propelled or autonomous device (e.g., a smart vacuum). If the object is inanimate and cannot alter its direction or velocity, VR display device 800 may determine, based on the direction and velocity, that the object is projected to enter the play area and may pose a danger to the user. VR display device 800 may therefore display an alert or notification to the user informing them of the object or may enable a passthrough mode allowing the user to see their surroundings through the VR content.

Self-propelled objects may be part of an IoT environment and may be remotely controllable. If a remotely controllable self-propelled object is determined by VR display device 800 to be on course to enter the play area, VR display device 800 may alter the direction or speed of travel of the self-propelled object. For example, VR display device 800 may transmit instructions, via communication path 806, communication network 808, and communication path 814, to IoT device controller 816 to alter the direction or speed of travel of the self-propelled object.

VR display device 800 may also be configured to alert a user when another person enters the area. VR display device 800 may communicate, via communication path 806, communications network 808, and communication path 818, with security system controller 820. Security system controller 820 may transmit notifications to VR display device 800 if it detects a door being opened, a window being opened, or movement in another area outside the detection range of VR display device 800. In response to such notification, VR display device 800 may be configured to enable a passthrough mode, allowing the user to see their surroundings through the VR content. Alternatively or additionally, security system controller 820 may transmit an identification and/or image of the person or object detected to have entered the area to VR display device 800. VR display device 800 may generate for display to the user the identification and/or image received from security system controller 820.

In some embodiments, an external imaging sensor may be used to detect movement. External imaging sensor 822 may communicate directly with VR display device 800 via communication path 824. For example, external imaging sensor 822 may use a short-range wireless communication protocol such as Bluetooth, ZigBee, ultra-wideband, or infrared to communicate directly with VR display device 800. In other embodiments, imaging sensor 822 is connected, via communication path 826, to communication network 808, through which VR display device 800 communicates with imaging sensor 822.

Figure 9:
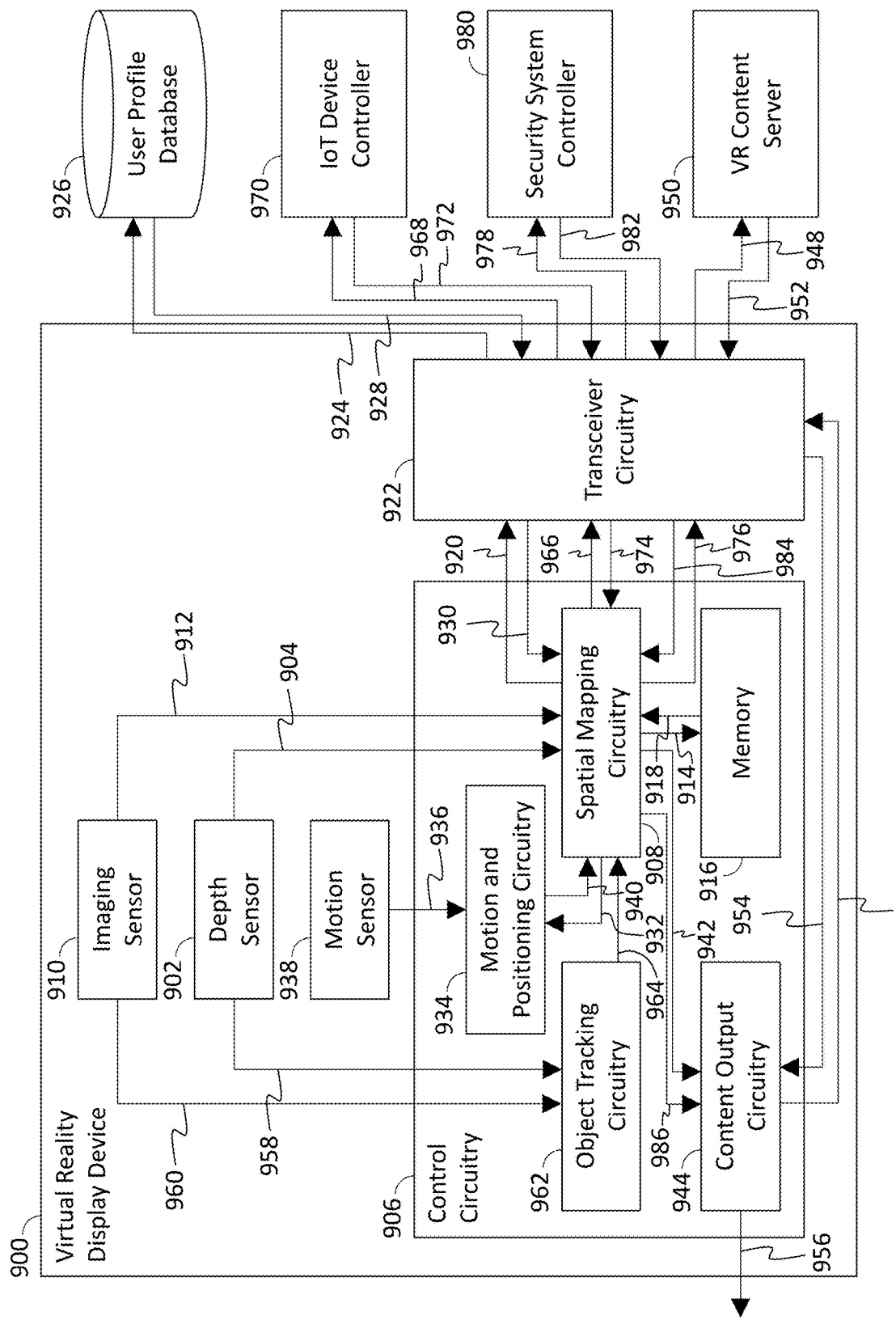
FIG. 9 is a block diagram showing components and dataflow therebetween of a system for auto-configuration of a virtual reality play area and avoidance of physical harm of user, in accordance with some embodiments of the disclosure.

FIG. 9 is a block diagram showing components and dataflow therebetween of a system for auto-configuration of a virtual reality play area and avoidance of physical harm of user, in accordance with some embodiments of the disclosure. VR display device 900, using depth sensor 902, performs depth measurements of the area surrounding VR display device 900. Depth sensor 902 may be a LiDAR sensor, ultrasonic ranging sensor, or any other suitable type of sensor for performing depth measurements. Depth sensor 902 transmits 904 depth measurements to control circuitry 906, where they are received using spatial mapping circuitry 908.

Control circuitry 906 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Spatial mapping circuitry 908 uses the depth measurements to construct a volumetric representation of the area surrounding VR display device 900. In some embodiments, in addition to depth measurements, imaging sensor 910 captures images of the area surrounding VR display device 900 and transmits 912 the captured images to spatial mapping circuitry 908. Spatial mapping circuitry 908 augments the volumetric representation of the area with the captured images to identify multiple obstructions and visual features such as furniture, walls, etc. that are located in the area.

Using the volumetric representation and, in some embodiments, the detected objects, spatial mapping circuitry 908 identifies a horizontal plane on which to base a play area. Several horizontal planes may be detected, depending on the number of surfaces in the area. For example, a table top, counter top, shelf, or other substantially horizontal surface may be detected in addition to the floor. To correctly identify the floor level, spatial mapping circuitry 908 may determine the height of VR display device 900 from the floor. This may be accomplished in several ways. For example, spatial mapping circuitry 908 may determine or retrieve the height of the user, which may be stored in a user profile. Spatial mapping circuitry 908 transmits 914 a request to memory 916 for the user's height information. Memory 916 may be an electronic storage device. As referred to herein, the phrase "electronic storage device" or "storage device" should be understood to mean any device for storing electronic data, such as random-access memory, read-only memory, hard drives, optical drives, solid state devices, quantum storage devices, or any other suitable fixed or removable storage devices, and/or any combination of the same. In response to the request, memory 916 transmits 918 the user's height information to spatial mapping circuitry 908. In some embodiments, the user profile is stored in a remote server or database. Spatial mapping circuitry 908 may therefore transmit 920 the request for the user's height information to transceiver circuitry 922. Transceiver circuitry 922 may comprise a network connection over which data can be transmitted to and received from remote devices, such as an ethernet connection, Wi Fi connection, mobile broadband interface, or connection employing any other suitable networking protocol. Transceiver circuitry 922 may also include a Bluetooth connection or other short-range wireless data connection through which VR display device 900 may communicate with other local devices. Transceiver circuitry 922 transmits 924 the request for the user's height to user profile database 926. In response, user profile database 926 transmits 928 the user's height information to transceiver circuitry 922, which in turn transmits 930 the information to spatial mapping circuitry 908. Spatial mapping circuitry 908 can then use the user's height as an approximation of the height of VR display device 900 from the floor. This is due to the fact that VR display device will sit lower on the user than their full height. Spatial mapping circuitry 908 may subtract an average distance from the top of a human head to the eyes from the user's height to more closely approximate the height of VR display device 900 from the floor. Spatial mapping circuitry 908 then identifies the horizontal plane closest to the height of VR display device 908 as the horizontal plane on which to base the play area.

As another example of how spatial mapping circuitry 908 may determine the height of VR display device 900 from the floor, spatial mapping circuitry 908 may cause VR display device 900 to prompt the user to look at their feet. Spatial mapping circuitry 908 then transmits 932 a request to motion and positioning circuitry 934 for a current inclination of VR display device 900. Motion and positioning circuitry 934 may receive 936 motion data from motion sensor 938. Motion sensor 938 may comprise one or more accelerometers, inertial measurements units, gyroscopes, or other suitable motion and/or position sensing circuitry. Motion and positioning circuitry 934 transmits 940, in response to the query, the current inclination of VR display device 900 to spatial mapping circuitry 908. Imaging sensor 910 and depth sensor 902 may be used to determine when the user is looking at their feet. The horizontal plane on which the user feet rest is identified. Spatial mapping circuitry 908 then determines, based on the distance to this horizontal plane and the current inclination of VR display device 900, a distance from a zero-inclination orientation of VR display device 900 to the floor.

In some embodiments, in may be advantageous to separately identify a vertical plan e of the area. A vertical plane may be identified based on object orientation. For example, a floor lamp or bookshelf may be oriented substantially vertically in the area. Spatial mapping circuitry 908 may prefer the use the orientation of a door or wall to establish the vertical plane on which to base the play area.

Once the horizontal plane has been established, spatial mapping circuitry 908 constructs the largest possible play area. Using the depth measurements, augmented in some embodiments with the captured images, spatial mapping circuitry 908 creates a boundary line on the horizontal plane at the furthest point from VR display device 900 in every direction. In some embodiments, to reduce processing load and/or processing time, spatial mapping circuitry 908 may place boundary points at some locations (e.g., at 5-degree intervals in a circle around VR display device 900) and draw straight line segments between each point. The boundary points may be placed at a minimum distance from an obstruction to prevent the user from harm should they stray outside the boundary by a small amount. The position of a boundary point may be a threshold distance from the closest point in a vertical slice above the boundary point. For example, a floor lamp may have a lampshade that is wider than its base. Spatial mapping circuitry 908 determines the closest point in a vertical slice and places the boundary point on the horizontal plane (i.e., the floor) at a threshold distance closer than the closest point. Once a closed shape has been established on the horizontal plane, the play area is extended vertically until another obstruction (e.g., a ceiling or a chandelier) is reached.

In some embodiments, a closed three-dimensional shape may be generated by spatial mapping circuitry 908 that fills all contiguous open space in the area, resulting in a concave shape, with some portions of the shape extending outward and other portions extending inward as objects within the area are excluded from the shape. If this shape were set as the play area boundary, it would be possible for a user to move into a portion of the play area that extends outward and then accidentally move outside the play area due to the concavity, causing themselves harm by colliding with the object around which the surface of the shape has been drawn. To avoid this, spatial mapping circuitry 908 determines whether the shape is concave. For example, spatial mapping circuitry 908 may draw a series of lines from one point on the surface of the three-dimensional shape to one or more points on different parts of the surface of the shape. If a line connecting a first point on the surface of the shape to a second point of the surface of the shape passes outside the shape, then the shape is determined to be concave.

If the shape is concave spatial mapping circuitry 908 truncates the shape to create a convex shape. This may be accomplished in several ways. For example, spatial mapping circuitry 908 may use a convex hull algorithm, such as Graham scan, Jarvis march, Chan's algorithm, or any other known method of computing a convex hull for a given set of points. In another example, spatial mapping circuitry 908 evaluates a series of horizontal slices or cross sections of the three-dimensional shape, each taken in a plane parallel to the horizontal plane. Spatial mapping circuitry 908 determines the area of each slice or cross section and selects the slice having the smallest area. Spatial mapping circuitry 908 may inscribe the largest possible convex shape, such as a circle, rectangle, or ellipse within the selected slice or cross section and then project the inscribed shape onto the horizonal plane. Spatial mapping circuitry 908 may then create a three-dimensional shape from the horizontal plane upward to a maximum height above the horizontal plane. Once the convex shape has been created, spatial mapping circuitry 908 constructs a play area based on the convex shape. If the three-dimensional shape is convex to being with, spatial mapping circuitry 908 constructs the play area based on the three-dimensional shape.

Spatial mapping circuitry 908 transmits 942 data describing the play area to content output circuitry 944. Content output circuitry 944 then constrains the output of VR content to within the play area. Content output circuitry 944 transmits 946 a request for VR content to transceiver circuitry 922, which in turn transmits 948 the request to VR content server 950. VR content server 950 transmits or streams 952 the requested VR content, which is received by transceiver circuitry 922. Transceiver circuitry 922 in turn transmits 954 the VR content to content output circuitry 944. Content output circuitry 944 then outputs 956 the VR content for consumption by the user.

During output of VR content, depth sensor 902 and imaging sensor 910 may each transmit (958 and 960, respectively) data to object tracking circuitry 962. Object tracking circuitry 962 may compare successive data received from depth sensor 902 and/or imaging sensor 910 to determine if an object in the surrounding area has moved. For example, a change in position of an object relative to other objects within the area may be determined as movement. The time between successive data may be used to determine the velocity with which the object is moving. Object tracking circuitry 962 may determine a path along which the object has traveled and extrapolate its movement. Object tracking circuitry 962 then transmits 964 the extrapolated movement path to spatial mapping circuitry 908. Spatial mapping circuitry 908 compares the extrapolated path with the play area to determine whether the object is projected to enter the play area. If the object is projected not to enter the play area, it does not pose a danger to the user and can be ignored. If the object is projected to enter the play area, spatial mapping circuitry 908 may determine whether the object can be redirected. For example, the object may be controllable as part of a smart home or IoT system. Imaging data may be used to determine the type of object. Spatial mapping circuitry 908 then transmits 966 an instruction to redirect the object away from the play area to transceiver circuitry 922, which in turn transmits 968 the instruction to IoT device controller 970. IoT device controller 970 may identify the specific device and instruct the device to avoid the play area. For example, the instruction transmitted by spatial mapping circuitry 908 may include coordinates describing the play area. IoT device controller 970 may use the coordinates to redirect the object's path of travel around the play area. If IoT device controller 970 cannot identify the device or cannot redirect the device, IoT device controller 970 may transmit 972 a notification that the device cannot be redirected. The notification is received at transceiver circuitry 922 and transmitted 974 to spatial mapping circuitry 908.

Spatial mapping circuitry 908 may also interface with a security system and receive notifications or other data indicating when a door or window has been opened, or when motion is detected by the security system. Spatial mapping circuitry 908 may periodically transmit 976 a status request to transceiver circuitry 922, which in turn transmits 978 the request to security system controller 980. In some embodiments, security system controller 980 may simply push data to spatial mapping circuitry 908 when a change in status of a security sensor is detected. In either case, security system controller 980 transmits 982 a notification or other data indicating the change is status to transceiver circuitry 922, which in turn transmits 984 the data to spatial mapping circuitry 908.

If an object is projected to enter the play area and cannot be redirected, or if the security system detects an open door or window or motion, spatial mapping circuitry 908 may determine where the object io projected to enter the play area or where the open door or window or motion was detected, relative to the position of VR display device 900. Spatial mapping circuitry 908 may then transmit 986 the location, as well as a representation of the object or representation of the security system notification to content output circuitry 944. Content output circuitry 944 may overlay the representation of the object or security system notification over the VR content, along with a directional indication informing the user of the direction, relative to the user, where the object or security alert comes from.

Figure 10:
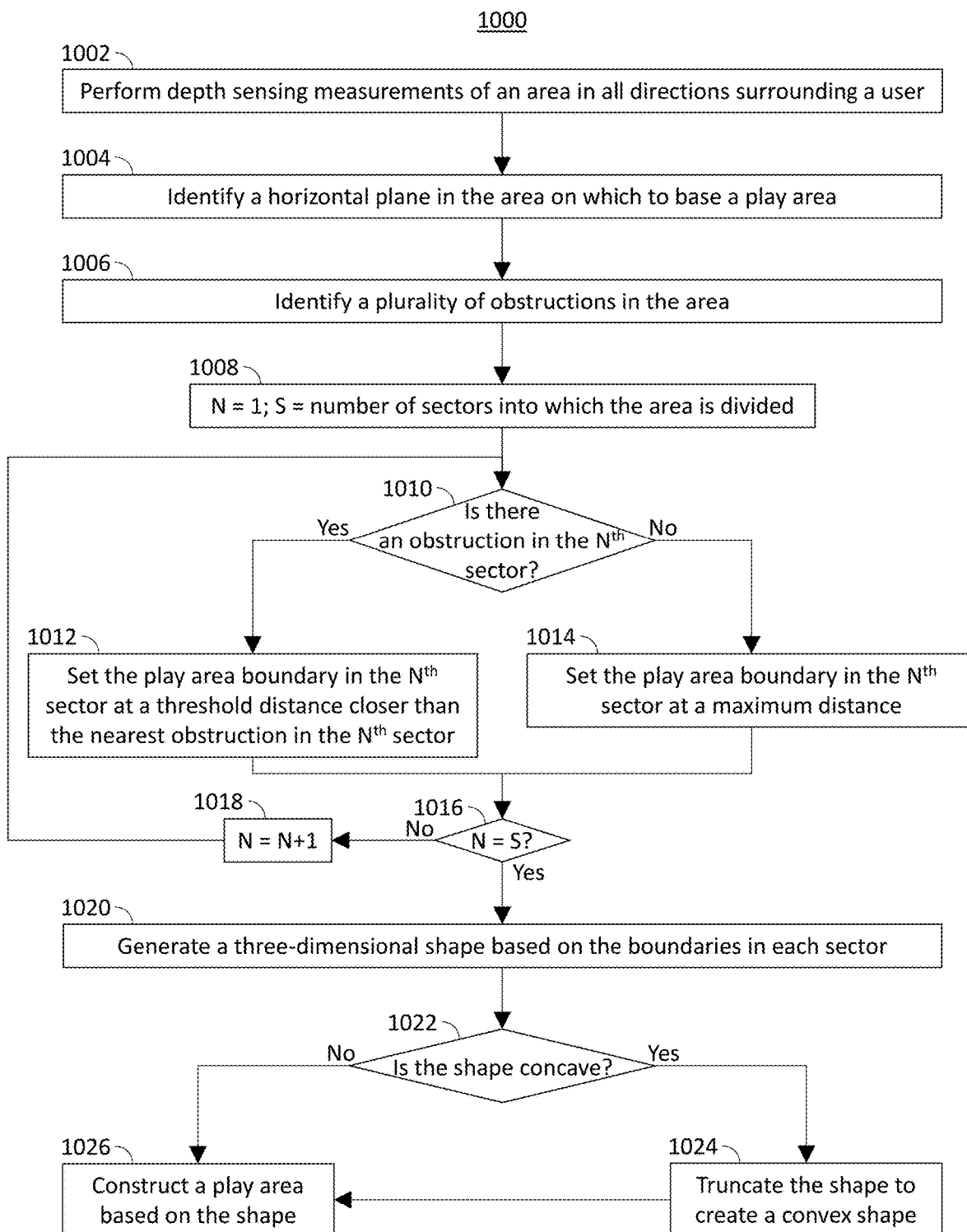
FIG. 10 is a flowchart representing an illustrative process for constructing the largest possible play area based on the surroundings of a user, in accordance with some embodiments of the disclosure.

FIG. 10 is a flowchart representing an illustrative process for constructing the largest possible play area based on the surroundings of a user, in accordance with some embodiments of the disclosure. Process 1000 may be implemented on control circuitry 906. In addition, one or more actions of process 1000 may be incorporated into or combined with one or more actions of any other process or embodiment described herein.

At 1002, control circuitry 906 performs depth sensing measurements of an area in all directions surrounding a user. For example, control circuitry 906 may use radar, LiDAR, ultrasound, or other types of sensors to measure the distance from the user to the nearest solid surface in a 360-degree sweep around the user. In some embodiments, control circuitry 906 captures one or more images of the area in all directions surrounding the user. Similar to the depth sensing, an imaging sensor may be used to capture images of the area in a 360-degree sweep around the user, or at intervals around the user, such as every 30 degrees. In some embodiments, a single panoramic image may be captured. Alternatively, the user may be prompted to turn in a circle, while a video clip of the area is recorded. In other embodiments, image data may be captured as a data stream from the imaging sensor, rather than individual images or video clips. Control circuitry 906 may then augment the depth sensing measurements using the captures one or more images. For example, control circuitry 906 may use the information gathered about each obstruction to identify fiducial markers within the area and/or more precisely align the coordinate system used to generate the play area. Control circuitry 906 may use image recognition to identify specific objects in the area and overlay additional information gained from such identifications on the depth sensing measurements. This results in a single spatial mapping of the area having increased accuracy based on information about each object or obstruction in the area.

At 1004, control circuitry 906 identifies a horizontal plane in the area on which to base a play area. Control circuitry 906 may identify a plurality of surfaces in the area surrounding the user. For example, a top or side surface of a piece of furniture may be identified as a surface. Control circuitry 906 may determine the orientation of each surface. For example, control circuitry 906 may retrieve an accelerometer reading, inertial measurement, or data recorded by any other suitable orientation sensor at the time the depth measurements were made to determine a baseline orientation. An angle of the respective surface relative to an axis of the spatial mapping can then be converted, based on the baseline orientation, to a true orientation.

Based on the orientation of each surface, control circuitry 906 identifies a horizontal plane of the area. Control circuitry 906 may identify a plurality of horizontal surfaces that match, or are within a threshold deviation from, a baseline horizontal orientation. Control circuitry 906 may therefore have to determine which of the plurality of horizontal surfaces should be used as the horizontal plane of the area. Control circuitry 906 may compare the height of the user with the height of each horizontal surface using method described above in connection with FIG. 9 in order to determine which horizontal surface corresponds to the floor.

At 1006, control circuitry 906 identifies a plurality of obstructions in the area. Using the depth sensing measurements, control circuitry 906 may identify objects in the area that cause changes in depth measurements beyond normal variations. Control circuitry 906 may determine from the depth sensing measurements that the distance from the VR display device to a surface at a first set of points in a given direction is a first distance, but that the distance to a surface at a second set of points in the same direction is a second distance that is closer than the first distance. The boundary of the 3D envelope of the play area may be set at or closer than the detected surface. Control circuitry 906 may detect a significant irregularity (i.e., more than a threshold deviation) in the surface geometry of the 3d Envelope and identify any concave portion of the surface (i.e., a portion of the surface that is closer that the surrounding portions) as an object or obstruction. This may be entirely automatic and require no additional processing beyond depth sensing. At 1008, control circuitry 906 initializes a counter variable N, setting its value to one, and a variable S representing the number of sectors into which the area is divided. For example, the area may be divided into 24 sectors, each 15 degrees wide, covering a 360-degree field around the user. At 1010, control circuitry 906 determines whether there is an obstruction in the $N^{th}$ sector. If so ("Yes" at 1010), then, at 1012, control circuitry 906 sets the play area boundary in the $N^{th}$ sector at a threshold distance closer than the nearest obstruction in the $N^{th}$ sector. If there are no obstructions in the $N^{th}$ sector ("No" at 1010), then, at 1014, control circuitry 906 sets the play area boundary in the $N^{th}$ sector at a maximum distance. The maximum distance may be the threshold distance closer than a vertical plane located in the $N^{th}$ sector. At 1016, control circuitry 906 determines whether N is equal to S, meaning that all sectors have been processed. If not ("No" at 1016), then, at 1018, control circuitry 906 increments that value of N by one, and processing returns to 1010.

If N is equal to S ("Yes" at 1016), then, at 1020, control circuitry 906 generates a three-dimensional shape based on the boundaries in each sector. For example, control circuitry 906 may determine a play area boundary for each respective sector at a plurality of positions within the sector, along both a horizontal axis and a vertical axis. The play area boundary for each sector may therefore be expressed as three-dimensional surface, oriented perpendicular to the horizontal plane, and extending from the horizontal plane to a maximum height above the horizontal plane. Control circuitry 906 may combine each boundary surface to generate a closed shape, or envelope, representing the maximum volume of contiguous open space in the area.

At 1022, control circuitry 906 determines whether the three-dimensional shape is concave. For example, control circuitry 906 may draw a series of lines from one point on the surface of the three-dimensional shape to one or more points on different parts of the surface of the shape. Control circuitry 906 then determines whether any line is outside the shape. For example, a line connecting a first point on the surface of the shape to a second point of the surface of the shape may be completely outside the shape if the shape is concave (i.e., portions of the shape stick out from the rest of the shape). If the shape is concave ("Yes" at 1022), then, at 1024, control circuitry 906 truncates the shape to create a convex shape. This may be accomplished in several ways. For example, control circuitry 906 may use a convex hull algorithm, such as Graham scan, Jarvis march, Chan's algorithm, or any other known method of computing a convex hull for a given set of points. In another example, control circuitry 906 evaluates a series of horizontal slices or cross sections of the three-dimensional shape, each taken in a plane parallel to the horizontal plane. Control circuitry 906 determines the area of each slice or cross section and selects the slice having the smallest area. Control circuitry 906 may inscribe the largest possible convex shape, such as a circle, rectangle, or ellipse within the selected slice or cross section and then project the inscribed shape onto the horizonal plane. Control circuitry 906 may then create a three-dimensional shape from the horizontal plane upward (i.e., along an axis perpendicular to the horizontal plane) to a maximum height above the horizontal plane.

Once the convex shape has been created, or if the three-dimensional shape is convex ("No" at 1022), at 1026, control circuitry 906 constructs a play area based on the shape. Control circuitry 906 may record the position of a series of points corresponding to the boundary of the three-dimensional shape or truncated shape. Control circuitry 906 then establishes the play area as the space within the series of points and may track the user's location within the space.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
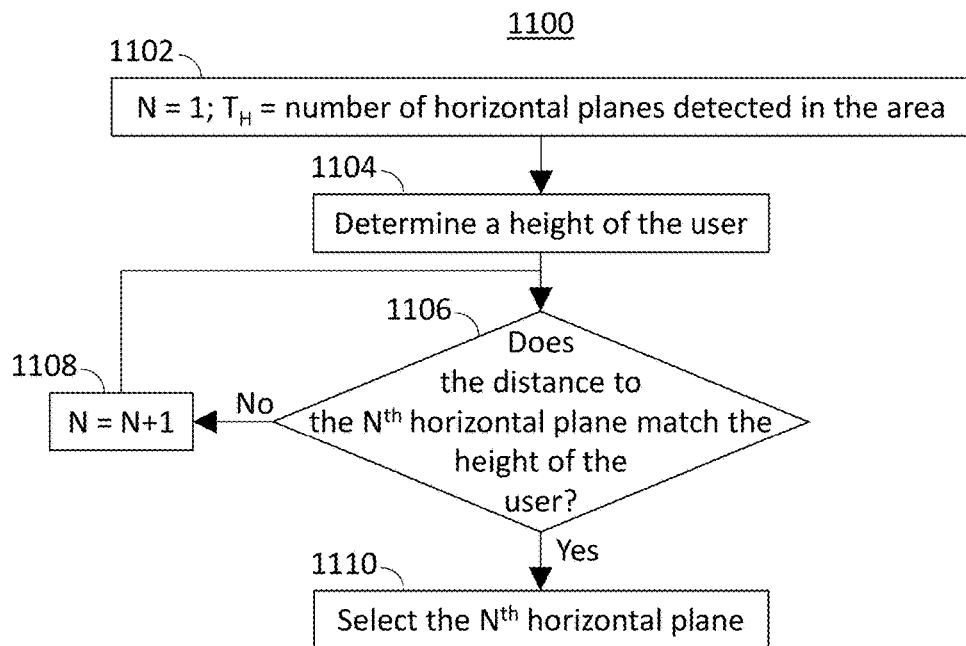
FIG. 11 is a flowchart representing an illustrative process for selecting a horizontal plane from which to construct a play area, in accordance with some embodiments of the disclosure.

FIG. 11 is a flowchart representing an illustrative process for selecting a horizontal plane from which to construct a play area, in accordance with some embodiments of the disclosure. Process 1100 may be implemented on control circuitry 906. In addition, one or more actions of process 1100 may be incorporated into or combined with one or more actions of any other process or embodiment described herein.

At 1102, control circuitry 906 initializes a counter variable N, setting its value to one, and a variable TH representing the number of horizontal planes detected in the area. At 1104, control circuitry 906 determines the height of the user. For example, control circuitry 806 may access user profile data describing physical characteristics of the user. As another example, control circuitry 906 may prompt the user the look at their feet. Control circuitry 806 can then measure the distance from the VR display device to the user's feet.

At 1106, control circuitry 906 determines whether the distance from the VR display device to the $N^{th}$ horizontal plane matches the height of the user. If not ("No" at 1106), then, at 1108, control circuitry 906 increments the value of N by one, and processing returns to 1106. If the distance from the VR display device to the $N^{th}$ horizonal plane does match the height of the user ("Yes" at 1106), then, at 1110, control circuitry 906 selects the $N^{th}$ horizontal plane as the horizontal plane on which the play area will be based.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
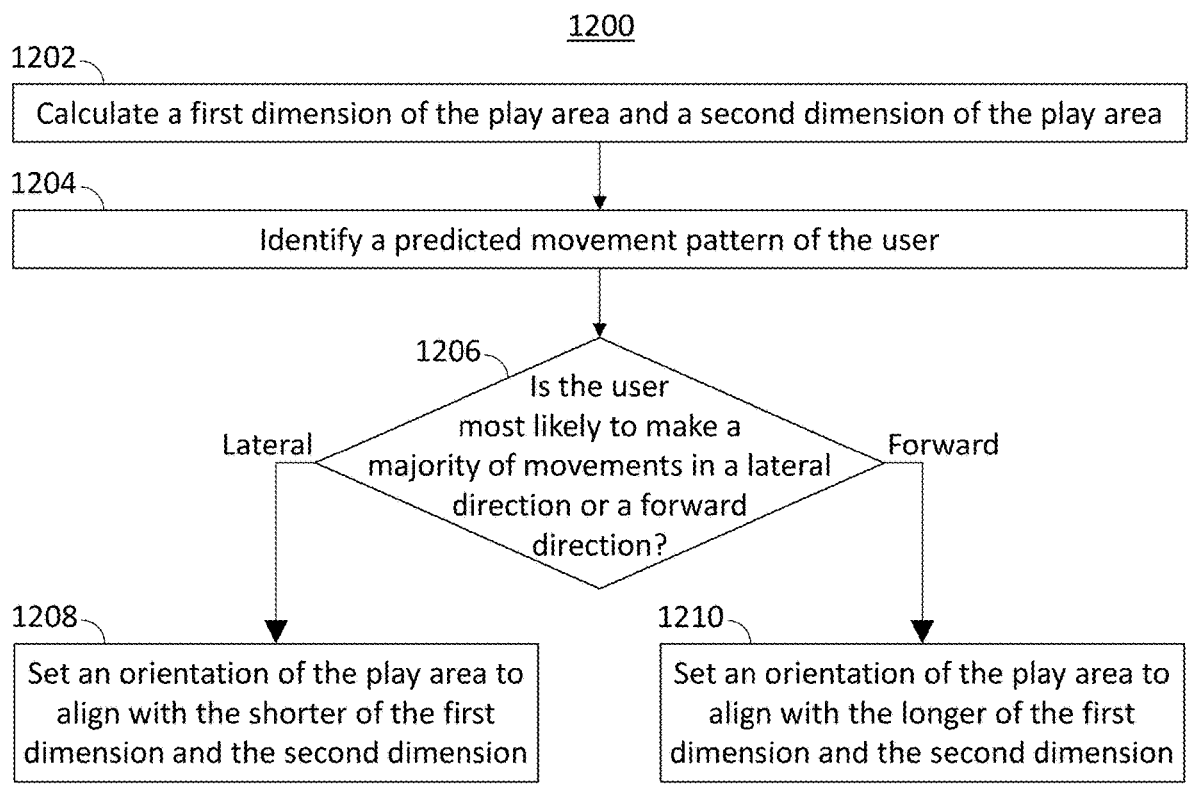
FIG. 12 is a flowchart representing an illustrative process for setting an orientation of a play area, in accordance with some embodiments of the disclosure.

FIG. 12 is a flowchart representing an illustrative process for setting an orientation of a play area, in accordance with some embodiments of the disclosure. Process 1200 may be implemented on control circuitry 906. In addition, one or more actions of process 1200 may be incorporated into or combined with one or more actions of any other process or embodiment described herein.

At 1202, control circuitry 906 calculates a first dimension of the play area and a second dimension of the play area. The first dimension of the play area may be calculated as the longest distance between opposite sides of the boundary. The second dimension is hen calculated as the distance from opposite sides of the boundary oriented at 90 degrees to the direction in which the first dimension was calculated.

At 1204, control circuitry 906 identifies a predicted movement pattern of the user. This may be based on historical movement data of the user stored in a user profile or may be based on the type of VR content being consumed. For example, the user may be playing a game, such as Beat Saber™ that does not require any forward or backward movement but does require lateral movement. At 1206, control circuitry 906 determines whether the user is most likely to make a majority of movements in a lateral direction or a forward direction. If the user will make a majority of movements in the lateral direction ("Lateral" at 1206), then, at 1208, control circuitry 906 sets the orientation of the play area to align with the shorter of the first dimension and the second dimension. Thus, when the user faces the "front" of the play area, the maximum amount of space is available to either side of the user. If the user will make the majority of movements in a forward direction ("Forward" at 1206), then, at 1210, control circuitry 906 sets the orientation of the play area to align with the longer of the first dimension and the second dimension. Thus, when the user faces the "front" of the play area, the maximum amount of space is available in front of and behind the user.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
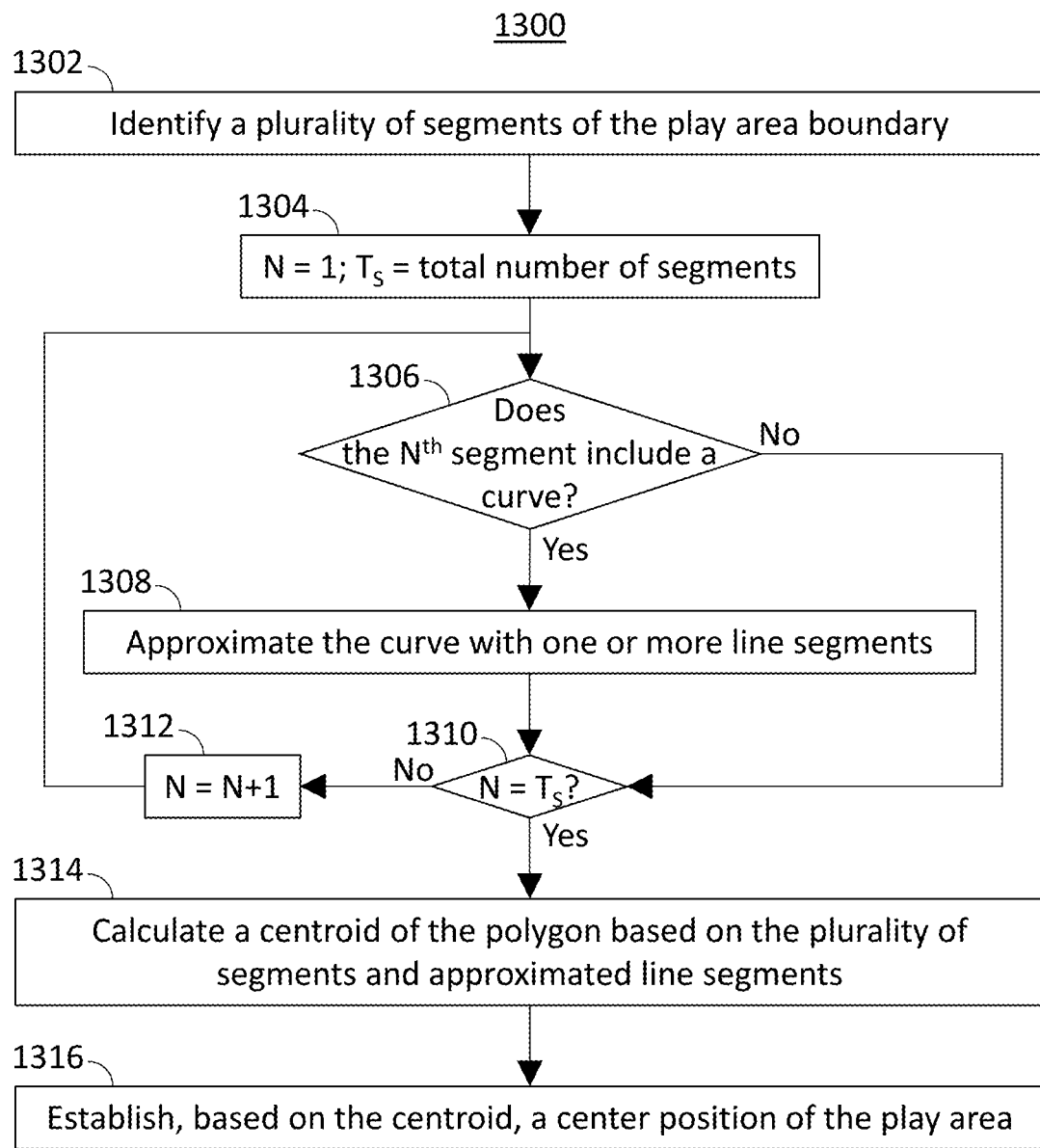
FIG. 13 is a flowchart representing an illustrative process for establishing a center position of the play area, in accordance with some embodiments of the disclosure.

FIG. 13 is a flowchart representing an illustrative process for establishing a center position of the play area, in accordance with some embodiments of the disclosure. Process 1300 may be implemented on control circuitry 906. In addition, one or more actions of process 1300 may be incorporated into or combined with one or more actions of any other process or embodiment described herein.

At 1302, control circuitry 906 identifies a plurality of segments of the play area boundary. For example, control circuitry 906 may detect a number of vertices of the boundary and identify a portion of the boundary between each pair of adjacent vertices as a segment of the boundary. At 1304, control circuitry 906 initializes a counter variable N, setting its value to one, and a variable $T_S$ representing the total number of segments of the boundary. At 1306, control circuitry 906 determines whether the $N^{th}$ segment includes a curve. For example, control circuitry 906 may calculate the coordinates of a plurality of points along a straight line between the two vertices that define the $N^{th}$ segment. Control circuitry 906 may then compare the actual boundary coordinates with the calculated coordinates. If the coordinates of the boundary deviate from the calculated coordinates by more than a threshold amount, then control circuitry 906 may determine that the $N^{th}$ segment includes a curve. If there is no deviation, or any deviation is less than the threshold amount, then control circuitry 906 may determine that the segment does not include a curve.

If the $N^{th}$ segment includes a curve ("Yes" at 1306), then, at 1308, control circuitry 906 approximates the curve with one or more line segments. This may be accomplished using any known methods for approximating curves using a plurality of line segments. After approximating the $N^{th}$ segment, or if the $N^{th}$ segment does not include a curve ("No" at 1306), at 1310 control circuitry 906 determines whether N is equal to $T_S$, meaning all the segments have been processed. If N is not equal to $T_S$ ("No" at 1310), then, at 1312, control circuitry 906 increments the value of N by one, and processing returns to 1306.

If N is equal to $T_S$ ("Yes" at 1310), then, at 1314, control circuitry 906 calculates a centroid of the polygon based on the plurality of segments and approximated line segments. This may be accomplished using any known method for calculating the centroid of a polygon, such as the plumb line method, geometric decomposition, or any other suitable method. At 1316, control circuitry 906 established, based on the centroid, a center position of the play area.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
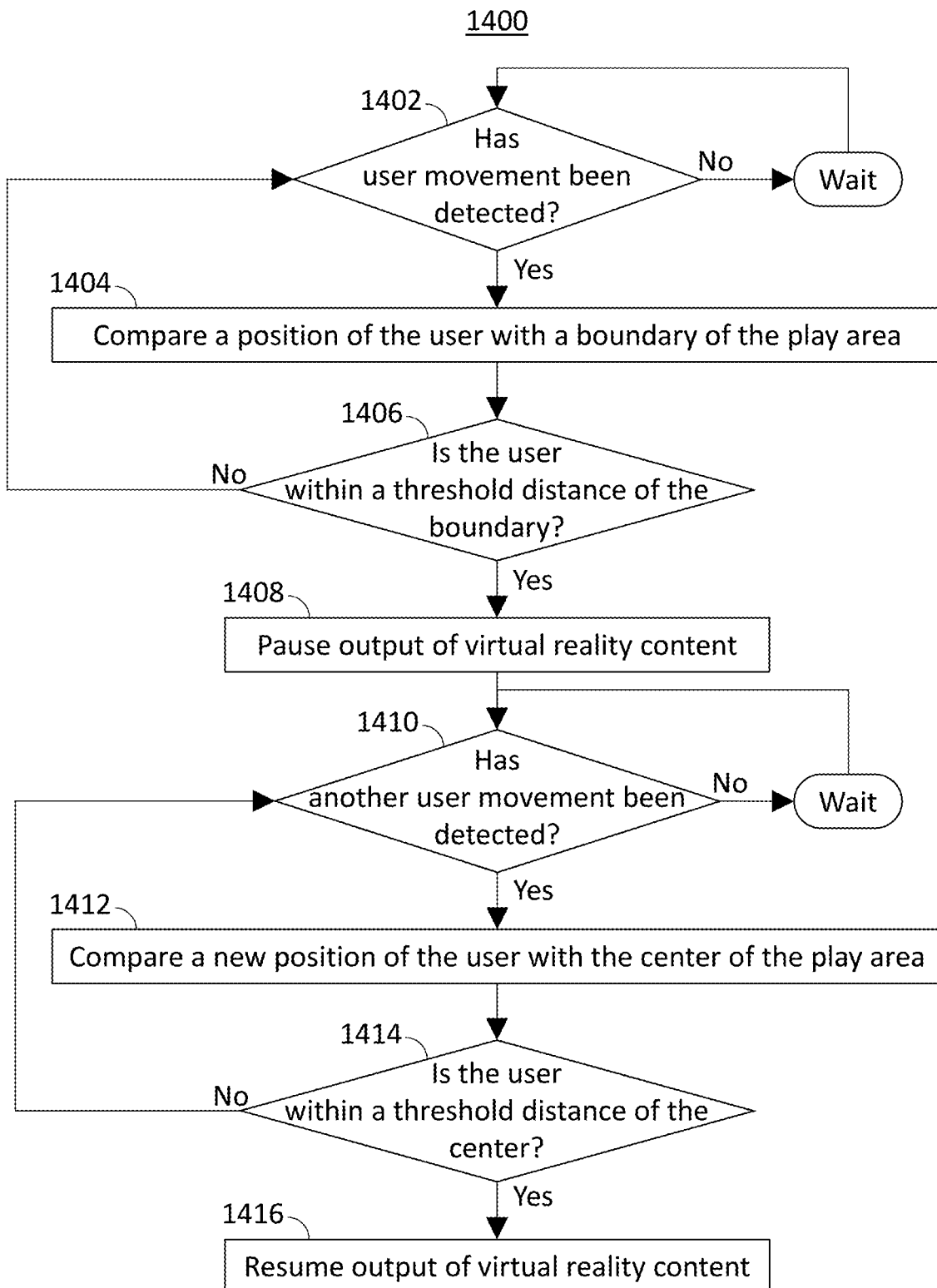
FIG. 14 is a flowchart representing an illustrative process for controlling output of VR content based on a user's position within a play area, in accordance with some embodiments of the disclosure.

FIG. 14 is a flowchart representing an illustrative process for controlling output of VR content based on a user's position within a play area, in accordance with some embodiments of the disclosure. Process 1400 may be implemented on control circuitry 906. In addition, one or more actions of process 1400 may be incorporated into or combined with one or more actions of any other process or embodiment described herein.

At 1402, control circuitry 906 determines whether the user movement has been detected. For example, control circuitry 906 may receive input for motion and orientation sensors integrated into the VR display device or may communicate with external sensors and/or cameras to capture user movements. If no movement has been detected ("No" at 1402), control circuitry 906 continues to wait for movement. If user movement has been detected ("Yes" at 1402), then, at 1404, control circuitry 906 compares a position of the user with a boundary of the play area. For example, control circuitry 906 may determine a current position of the user within the play area and may identify the closest boundary to the user. Control circuitry 906 may then calculate the distance between the user's current position and the closest boundary of the play area. At 1406, control circuitry 906 determines whether the user is within a threshold distance of the boundary. For example, the user may be less than 6 inches from the boundary. If the user is further that the threshold distance from the boundary ("No" at 1406), then processing returns to 1402.

If the user is within the threshold distance of the boundary ("Yes" at 1406), then, at 1408, control circuitry 906 pauses output of VR content. This prevents the user from continuing to move towards the boundary and ensures that the user does not exit the play area and harm themselves by colliding with or hitting and object in the area. In some embodiments, control circuitry 906 may guide the user back toward the center of the play area.

At 1410, control circuitry 906 determines whether another user movement has been detected. If not ("No" at 1410), then control circuitry 906 continues to wait until movement has been detected. If another movement has been detected ("Yes" at 1410), then, at 1412, control circuitry 906 compares a new position of the user with the center of the play area. At 1414, control circuitry 906 determines whether the user is within a threshold distance of the center of the play area. If not ("No" at 1414), then processing returns to 1410. If the user's position is within the threshold distance of the center of the play area ("Yes" at 1414), then, at 1416, control circuitry 906 resumes output of the VR content.

The actions or descriptions of FIG. 14 may be used with any other embodiment of this disclosure. In addition, the actions and descriptions described in relation to FIG. 14 may be done in suitable alternative orders or in parallel to further the purposes of this disclosure.

Figure 15:
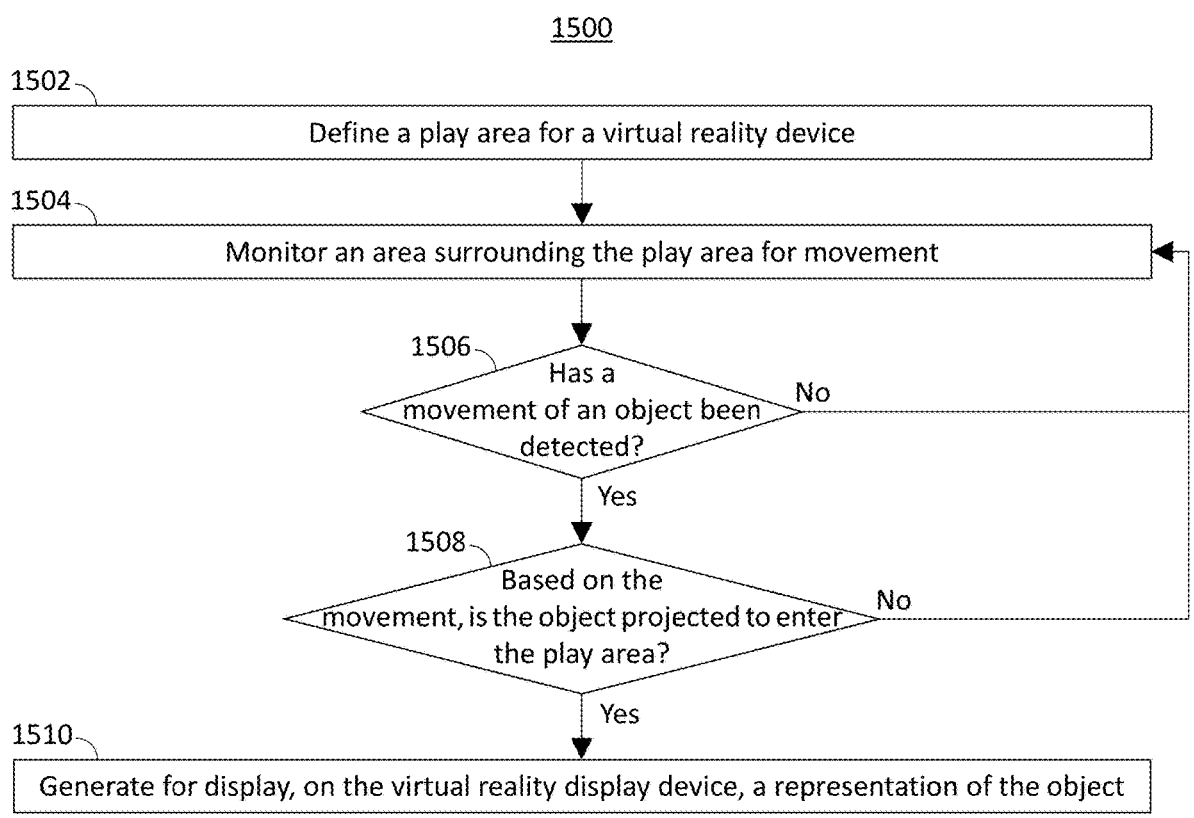
FIG. 15 is a flowchart representing an illustrative process for generating for display a representation of an object that is projected to enter a play area, in accordance with some embodiments of the disclosure.

FIG. 15 is a flowchart representing an illustrative process for generating for display a representation of an object that is projected to enter a play area, in accordance with some embodiments of the disclosure. Process 1500 may be implemented on control circuitry 906. In addition, one or more actions of process 1500 may be incorporated into or combined with one or more actions of any other process or embodiment described herein.

At 1502, control circuitry 906 defines a play area for a VR device. This may be accomplished using auto-configuration methods described above, or through manual input by a user. At 1504, control circuitry 906 monitors an area surrounding the play area for movement. For example, control circuitry 906 may periodically receive input from depth sensors and imaging sensors. Control circuitry 906 may them compare this data with the previously received data to determine if an object in the area has moved.

At 1506, control circuitry 906 determines whether movement of an object has been detected. If not ("No" at 1506), then processing returns to 1504, where control circuitry 906 continues to monitor the area for movement. If movement has been detected ("Yes" at 1506), then, at 1508, control circuitry 906 determines, based on the movement, whether the object is projected to enter the play area. This may be accomplished using methods described above in connection with FIGS. 5 and 9. If the object is projected not to enter the play area ("No" at 1508), then processing returns to 1504, where control circuitry 906 continues to monitor the area for movement.

If the object is projected to enter the play area ("Yes" at 1508), then, at 1510, control circuitry 906 generates for display, on the VR display device, a representation of the object. This may be an image, a wireframe approximation of the shape of the object, or any other suitable representation. In some embodiments, a spatial audio output may also be generated, giving the user a sense of the direction from which the object is approaching, even if the object is not within the user's current field of view.

The actions or descriptions of FIG. 15 may be used with any other embodiment of this disclosure. In addition, the actions and descriptions described in relation to FIG. 15 may be done in suitable alternative orders or in parallel to further the purposes of this disclosure.

Figure 16:
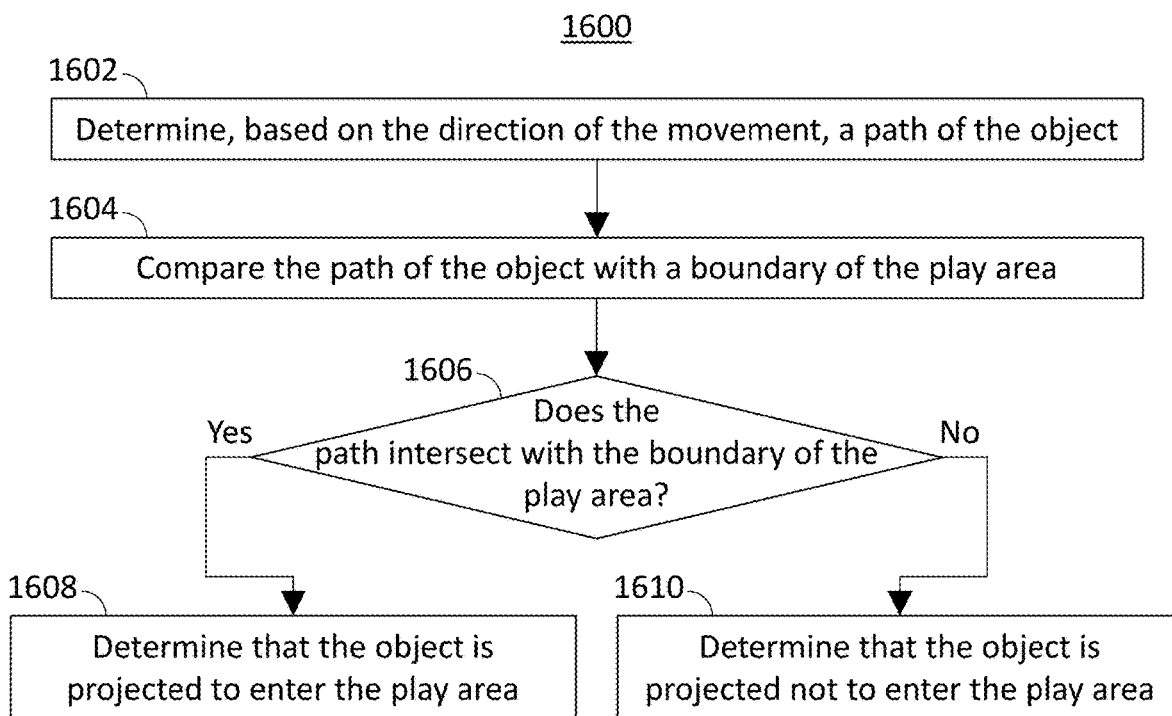
FIG. 16 is a flowchart representing an illustrative process for determining whether an object is projected to enter a play area based on a direction of movement, in accordance with some embodiments of the disclosure.

FIG. 16 is a flowchart representing an illustrative process for determining whether an object is projected to enter a play area based on a direction of movement, in accordance with some embodiments of the disclosure. Process 1600 may be implemented on control circuitry 906. In addition, one or more actions of process 1600 may be incorporated into or combined with one or more actions of any other process or embodiment described herein.

At 1602, control circuitry 906 determines, based on the direction of movement, a path of the object. For example, control circuitry 906 may extrapolate a travel path from the detected direction of travel. The path may be a straight line or curved, depending on the actual movement detected. At 1604, control circuitry 906 compares the path of the object with a boundary of the play area. For example, control circuitry 906 may compare coordinates of one or more points along the extrapolates travel path to determine if any point falls on or within the boundary of the play area. At 1606, control circuitry 906 determines, based on the comparison, whether the path intersects with the boundary. If so ("Yes" at 1606), then, at 1608, control circuitry 906 determines that the object is projected to enter the play area. If the path does not intersect the boundary ("No" at 1606), then, at 1610, control circuitry 906 determines that the object is projected not to enter the play area.

The actions or descriptions of FIG. 16 may be used with any other embodiment of this disclosure. In addition, the actions and descriptions described in relation to FIG. 16 may be done in suitable alternative orders or in parallel to further the purposes of this disclosure.

Figure 17:
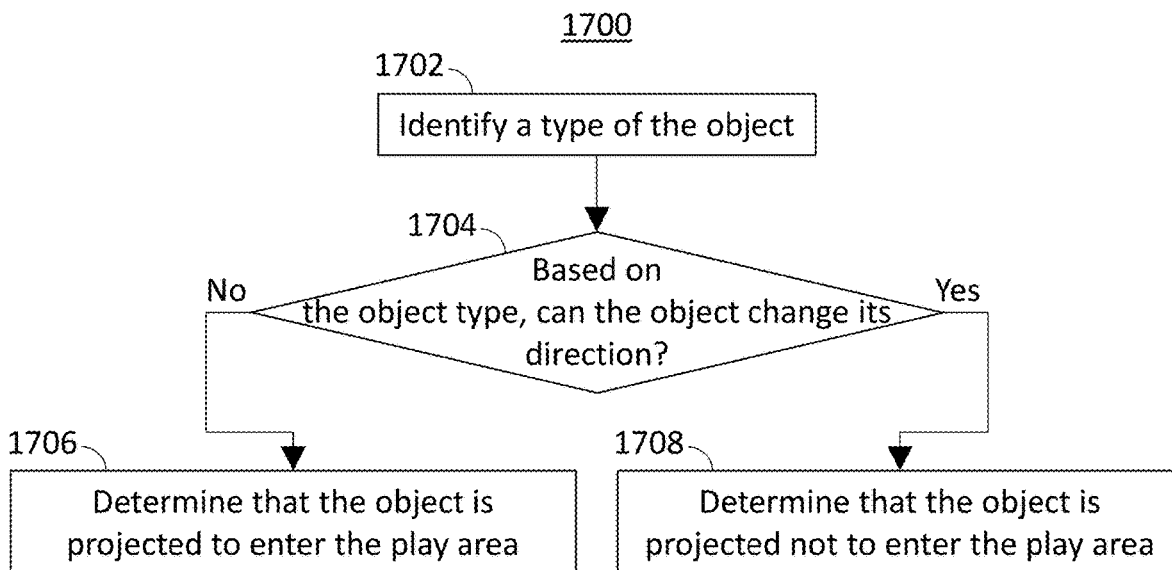
FIG. 17 is a flowchart representing an illustrative process for determining whether an object is projected to enter a play area based on the type of object, in accordance with some embodiments of the disclosure.

FIG. 17 is a flowchart representing an illustrative process for determining whether an object is projected to enter a play area based on the type of object, in accordance with some embodiments of the disclosure. Process 1700 may be implemented on control circuitry 906. In addition, one or more actions of process 1700 may be incorporated into or combined with one or more actions of any other process or embodiment described herein.

At 1702, control circuitry 906 identifies a type of the object. For example, control circuitry 906 may use image recognition, machine learning, neural networks, or any other suitable method for processing an image of the object to identify the type of object. In some embodiments, the object may contain a communication device, such as a Bluetooth transceiver, which may be accessed by control circuitry 906. Control circuitry 906 may then request device identification from the object.

At 1704, control circuitry 906 determines, based on the object type, whether the object can change its direction. For example, a living being such as a person or animal can change its direction of travel on its own. Autonomous self-propelled objects, such as smart vacuums, can have their direction of travel altered programmatically. Fully inanimate objects do not have any means to change their direction of travel. If the object is of a type that cannot change its direction ("No" at 1704), then, at 1706, control circuitry 906 determines that the object is projected to enter the play area. If the object is of a type that can change its direction ("Yes" at 1704), then, at 1708, control circuitry 906 determines that the object is projected not to enter the play area.

The actions or descriptions of FIG. 17 may be used with any other embodiment of this disclosure. In addition, the actions and descriptions described in relation to FIG. 17 may be done in suitable alternative orders or in parallel to further the purposes of this disclosure.

Figure 18:
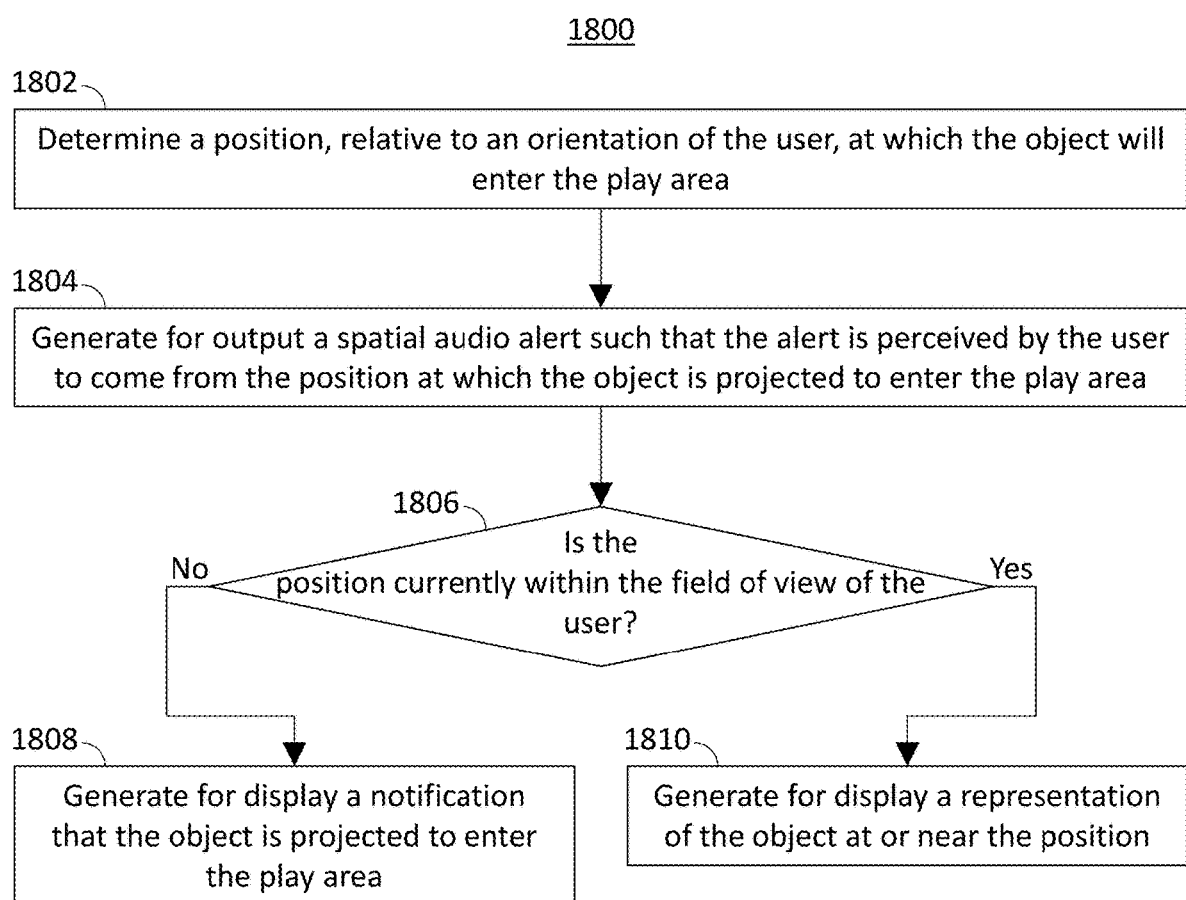
FIG. 18 is a flowchart representing an illustrative process for notifying a user that an object is projected to enter a play area, in accordance with some embodiments of the disclosure.

FIG. 18 is a flowchart representing an illustrative process for notifying a user that an object is projected to enter a play area, in accordance with some embodiments of the disclosure. Process 1800 may be implemented on control circuitry 906. In addition, one or more actions of process 1800 may be incorporated into or combined with one or more actions of any other process or embodiment described herein.

At 1802, control circuitry 906 determines a position, relative to an orientation of the user, at which the object is projected to enter the play area. For example, the current orientation of the user may be detected and set to zero degrees of a 360-degree field of view around the user. Control circuitry 906 may then transform a planar coordinate of the position at which the object is projected to enter the play area into a radial coordinate relative to the user's orientation. At 1804, control circuitry 906 generates for output a spatial audio alert such that the alert is perceived by the user to come from the position at which the object is projected to enter the play area. This may be accomplished using any known spatial audio processing and output methods.

At 1806, control circuitry 906 determines whether the position at which the object is projected to enter the play area is current within the field of view of the user. For example, with the user's current orientation set to zero degrees, the user's field of view may extend from 90 degrees to the user's left (i.e., 270 degrees) to 90 degrees to the user's right (i.e., 90 degrees). If the radial coordinate of the position at which the object is projected to enter the play area is above 90 degrees and below 270 degrees, then the position is not within the user's field of view. If the position is not within the user's field of view ("No" at 1806), then, at 1808, control circuitry 906 generates for display a notification that the object is projected to enter the play area. If, however, the position is within the field of view of the user ("Yes" at 1806), then, at 1810, control circuitry 906 generates for display a representation of the object at or near the position at which the object is projected to enter the play area.

The actions or descriptions of FIG. 18 may be used with any other embodiment of this disclosure. In addition, the actions and descriptions described in relation to FIG. 18 may be done in suitable alternative orders or in parallel to further the purposes of this disclosure.

Figure 19:
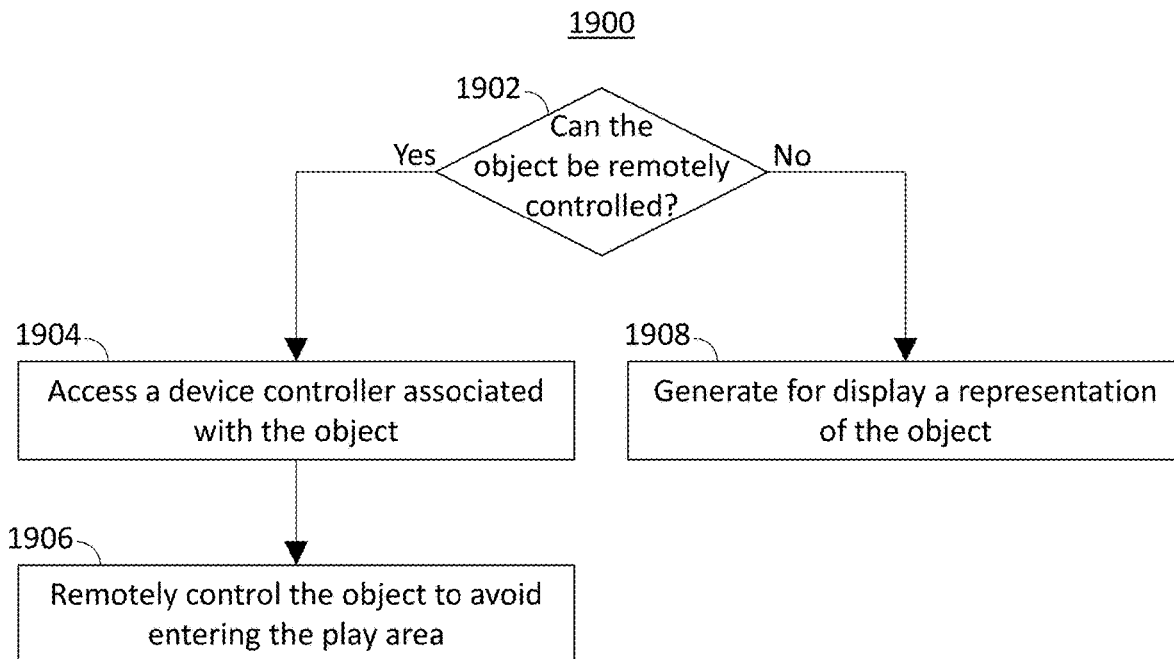
FIG. 19 is a flowchart representing an illustrative process for preventing an object from entering a play area, in accordance with some embodiments of the disclosure.

FIG. 19 is a flowchart representing an illustrative process for preventing an object from entering a play area, in accordance with some embodiments of the disclosure. Process 1900 may be implemented on control circuitry 906. In addition, one or more actions of process 1900 may be incorporated into or combined with one or more actions of any other process or embodiment described herein.

At 1902, control circuitry 906 determines whether the object can be remotely controlled. For example, control circuitry 906 may identify the object as a self-propelled autonomous device (e.g., a smart vacuum) connected to an IoT environment. If the object can be remotely controlled ("Yes" at 1902), then, at 1904, control circuitry 906 accesses a device controller associated with the object. For example, control circuitry 906 may connect to an IoT device controller with which the object communicated. At 1906, control circuitry 906 remotely controls the object to avoid entering the play area. For example, control circuitry 906 sends a request to an IoT device controller to alter direction of travel of the object. Control circuitry 906 may first request a current course set for the object (e.g., a path through a room that the object is currently following). Control circuitry 906 may analyze the course to determine which portions of the course run through the play area. Control circuitry 906 may then alter the course only as much as is needed to avoid entering the play are and transmit the altered course to the IoT device controller. If the object cannot be remotely controlled ("No" at 1902), then, at 1910, control circuitry 906 generates for display a representation of the object to alert the user that it is projected to enter the play area.

The actions or descriptions of FIG. 19 may be used with any other embodiment of this disclosure. In addition, the actions and descriptions described in relation to FIG. 19 may be done in suitable alternative orders or in parallel to further the purposes of this disclosure.

Figure 20:
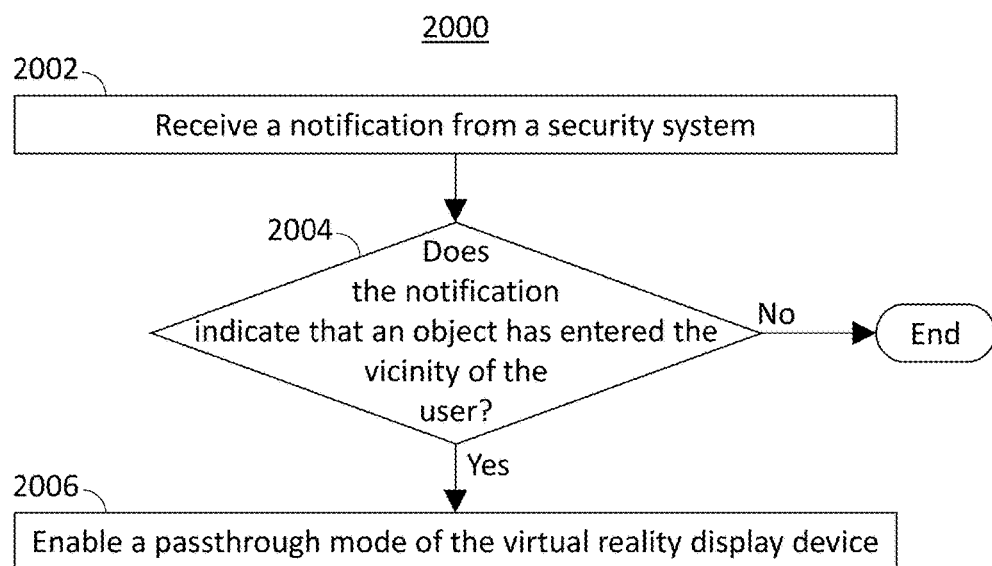
FIG. 20 is a flowchart representing an illustrative process for enabling a passthrough mode of a VR display device, in accordance with some embodiments of the disclosure.

FIG. 20 is a flowchart representing an illustrative process for enabling a passthrough mode of a VR display device, in accordance with some embodiments of the disclosure. Process 2000 may be implemented on control circuitry 906. In addition, one or more actions of process 2000 may be incorporated into or combined with one or more actions of any other process or embodiment described herein.

At 2002, control circuitry 906 receives a notification from a security system. The notification may be triggered by a door sensor, window sensor, motion sensor, etc. At 2004, control circuitry 906 determines whether the notification indicates that an object has entered the vicinity of the user. For example, the notification may indicate that a door was opened. The notification may include data from multiple sensors. For example, the notification may indicate that a door was opened and that a motion sensor detected motion in an area near the door. This may indicate that a person entered the area. If the notification does not indicate that an object has entered the area ("No" at 2004), then the process ends. If, however, the notification does indicate that an object has entered the area ("Yes" at 2004), then, at 2006, control circuitry 906 enables a passthrough mode of the VR display device. This allows the user to see their surroundings through the VR content. The user can then see who or what may have entered the area.

The actions or descriptions of FIG. 20 may be used with any other embodiment of this disclosure. In addition, the actions and descriptions described in relation to FIG. 20 may be done in suitable alternative orders or in parallel to further the purposes of this disclosure.

FIG. 21 is a flowchart representing an illustrative process for generating for display a representation of an object that is projected to enter a play area only if the object is within a threshold distance of a user, in accordance with some embodiments of the disclosure. Process 2100 may be implemented on control circuitry 906. In addition, one or more actions of process 2100 may be incorporated into or combined with one or more actions of any other process or embodiment described herein.

At 2102, control circuitry 906 receives an input defining a distance threshold from the VR display device for detecting motion. For example, a user may not want to be alerted to motion that is far outside the play area, or even at the extremities of the play area. The user may therefore enter a maximum distance beyond which any motion should be ignored. This may be advantageous to the user in a crowded setting, such as during a demonstration at a trade show, where many people may be present in the vicinity of the user. At 2104, control circuitry 906 determines whether motion of an object has been detected in the area surrounding the user. If no motion has been detected ("No" at 2104), then control circuitry 906 continues to wait until motion is detected.

If motion of an object is detected in the area surrounding the user ("Yes" at 2104), then, at 2106, control circuitry 906 determines whether the object is located within the threshold distance from the VR display device. For example, control circuitry 906 may use depth sensing measurement techniques to determine a distance to the object. The determined distance is then compared to the distance threshold. If the object is outside the threshold ("No" at 2106), then control circuitry 906 waits a short period of time before processing returns to 2104. If the object is within the threshold distance from the VR display device ("Yes" at 2106), then, at 2108, control circuitry 906 generates for display a representation of the object.

The actions or descriptions of FIG. 21 may be used with any other embodiment of this disclosure. In addition, the actions and descriptions described in relation to FIG. 21 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of preventing physical harm to a user of a virtual reality display device, the method comprising:
receiving spatial data corresponding to a physical environment of the virtual reality display, based on at least one of:
(a) one or more depth sensors; or
(b) one or more imaging sensors;
identifying boundaries of the physical environment based at least in part on the spatial data;
defining a play area based on the identified boundaries, wherein the play area is smaller than and encompassed entirely within the identified boundaries;
detecting, using at least one of: (a) one or more motion sensors or (b) the one or more imaging sensors, movement of an object with respect to the defined play area, wherein the object is positioned outside the play area and within a threshold distance of the play area, and wherein the movement is in the physical environment toward the play area;
determining, based on the direction of the movement of the object, a path of the object;
determining, based on the path of the object and a boundary of the play area, whether the object is projected to enter the play area; and
based on determining that the object is projected to enter the play area, generating for display to the user, on the virtual reality display device, a representation of the object.

2. The method of claim 1, wherein the movement has a direction, and wherein determining, based on the movement, whether the object is projected to enter the play area further comprises
comparing the path of the object with a boundary of the play area.

3. The method of claim 1, wherein the movement has a direction and a velocity, and wherein determining, based on the movement, whether the object is projected to enter the play area further comprises:
identifying a type of the object;
determining, based on the type of the object, whether the object can change the direction or velocity of the movement; and
in response to determining that the object cannot change its direction or its velocity, determining that the object is projected to enter the play area.

4. The method of claim 1, further comprising:
determining a position, relative to an orientation of the user, at which the object is projected to enter the play area.

5. The method of claim 4, further comprising, further in response to determining that the object is projected to enter the play area:
generating for output a spatial audio alert such that the audio alert is perceived by the user to come from the position at which the object is projected to enter the play area.

6. The method of claim 4, further comprising:
determining whether the position at which the object is projected to enter the play area is currently within a field of view of the user; and
in response to determining that the position at which the object is projected to enter the play area is not currently within the field of view of the user, generating for display, on the virtual reality display device, within the field of view of the user, a notification that the object is projected to enter the play area.

7. The method of claim 6, wherein the notification comprises an indication of the position at which the object is projected to enter the play area.

8. The method of claim 1, further comprising:
determining whether the object can be remotely controlled;
in response to determining that the object can be remotely controlled, remotely controlling the object to avoid entering the play area; and
in response to determining that the object cannot be remotely controlled, generating for display, on the virtual reality display device, the representation of the object.

9. The method of claim 1, further comprising:
receiving a notification from a security system; and
in response to receiving the notification, enabling a pass-through mode of the virtual reality display device.

10. The method of claim 1, further comprising:
receiving an input defining a distance threshold from the virtual reality display device for detecting motion,
wherein generating for display to the user, on the virtual reality display device, a representation of the object occurs further in response to determining that the object is within the threshold distance from the virtual reality display device.

11. A system of preventing physical harm to a user of a virtual reality display device, the system comprising:
spatial mapping circuitry; and
control circuitry configured to:
receive spatial data, captured via the spatial mapping circuitry, corresponding to a physical environment of the virtual reality display, based on at least one of:
(a) one or more depth sensors; or
(b) one or more imaging sensors;
identify boundaries of the physical environment based at least in part on the spatial data;
define a play area based on the identified boundaries, wherein the play area is smaller than and encompassed entirely within the identified boundaries;
detect, using the spatial data and at least one of: (a) one or more motion sensors or (b) the one or more imaging sensors, movement of an object with respect to the defined play area, wherein the object is positioned outside the play area and within a threshold distance of the play area, and wherein the movement is in the physical environment toward the play area;
determine, based on the movement of the object, a path of the object;
determine, based on the path of the object and a boundary of the play area, whether the object is projected to enter the play area; and
based on determining that the object is projected to enter the play area, generate for display to the user, on the virtual reality display device, a representation of the object.

12. The system of claim 11, wherein the movement has a direction, and wherein the control circuitry configured to determine, based on the movement, whether the object is projected to enter the play area is further configured to
compare the path of the object with a boundary of the play area.

13. The system of claim 11, wherein the movement has a direction and a velocity, and wherein the control circuitry configured to determine, based on the movement, whether the object is projected to enter the play area is further configured to:
- identify a type of the object;
- determine, based on the type of the object, whether the object can change the direction or velocity of the movement; and
- in response to determining that the object cannot change its direction or its velocity, determine that the object is projected to enter the play area.

14. The system of claim 11, wherein the control circuitry is further configured to:
- determine a position, relative to an orientation of the user, at which the object is projected to enter the play area.

15. The system of claim 14, wherein the control circuitry is further configured to, further in response to determining that the object is projected to enter the play area:
- generate for output a spatial audio alert such that the audio alert is perceived by the user to come from the position at which the object is projected to enter the play area.

16. The system of claim 14, wherein the control circuitry is further configured to:
- determine whether the position at which the object is projected to enter the play area is currently within a field of view of the user; and
- in response to determining that the position at which the object is projected to enter the play area is not currently within the field of view of the user, generate for display, on the virtual reality display device, within the field of view of the user, a notification that the object is projected to enter the play area.

17. The system of claim 16, wherein the notification comprises an indication of the position at which the object is projected to enter the play area.

18. The system of claim 11, wherein the control circuitry is further configured to:
- determine whether the object can be remotely controlled;
- in response to determining that the object can be remotely controlled, remotely control the object to avoid entering the play area; and
- in response to determining that the object cannot be remotely controlled, generate for display, on the virtual reality display device, the representation of the object.

19. The system of claim 11, wherein the control circuitry is further configured to:
- receive a notification from a security system; and
- in response to receiving the notification, enable a pass-through mode of the virtual reality display device.

20. The system of claim 11, wherein the control circuitry is further configured to:
- receive an input defining a distance threshold from the virtual reality display device for detecting motion,
- wherein the control circuitry configured to generate for display to the user, on the virtual reality display device, a representation of the object is further configured to do so in response to determining that the object is within the threshold distance from the virtual reality display device.

* * * * *